(12) United States Patent
Ji et al.

(10) Patent No.: US 11,143,774 B2
(45) Date of Patent: Oct. 12, 2021

(54) METHOD AND SYSTEM FOR SEPARATING BLENDED SEISMIC DATA

(71) Applicant: SHELL OIL COMPANY, Houston, TX (US)

(72) Inventors: Ying Ji, Katy, TX (US); Zijian Tang, Rijswijk (NL); Guido Jozef Maria Baeten, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 652 days.

(21) Appl. No.: 16/064,295

(22) PCT Filed: Dec. 19, 2016

(86) PCT No.: PCT/EP2016/081742
§ 371 (c)(1),
(2) Date: Jun. 20, 2018

(87) PCT Pub. No.: WO2017/108690
PCT Pub. Date: Jun. 29, 2017

(65) Prior Publication Data
US 2019/0011588 A1    Jan. 10, 2019

Related U.S. Application Data

(60) Provisional application No. 62/301,805, filed on Mar. 1, 2016, provisional application No. 62/270,731, filed on Dec. 22, 2015.

(51) Int. Cl.
*G01V 1/00* (2006.01)
*G01V 1/36* (2006.01)
*G01V 1/38* (2006.01)

(52) U.S. Cl.
CPC .............. *G01V 1/364* (2013.01); *G01V 1/005* (2013.01); *G01V 1/36* (2013.01); *G01V 1/3808* (2013.01); *G01V 2210/244* (2013.01)

(58) Field of Classification Search
None
See application file for complete search history.

(56) References Cited

U.S. PATENT DOCUMENTS

3,349,866 A * 10/1967 Mifsud .................... G01V 1/20
367/61
5,550,788 A * 8/1996 Pavone .................... G01V 1/48
367/25

(Continued)

FOREIGN PATENT DOCUMENTS

EP          2592439 A2    5/2013
WO       2015001058 A2    1/2015
WO    WO-2017108690 A1 *  6/2017  ............ G01V 1/364

OTHER PUBLICATIONS

Dragoset, "Marine Vibrators and the Doppler Effect", Geophysics, vol. 53, No. 11, Nov. 1, 1988, pp. 1388-1398.

(Continued)

*Primary Examiner* — Isam A Alsomiri
*Assistant Examiner* — Jonathan D Armstrong
(74) *Attorney, Agent, or Firm* — Shell Oil Company

(57) ABSTRACT

Simultaneous sources are separated with a deblending method wherein the fullband data deblended on a source-by-source basis. The fullband data is first decomposed into multiple subbands, and then a non-equispaced subband Radon transform is used to transform the decomposed data into the Radon domain. The deblending process is solved subband by subband by minimising a nonlinear objective function. The solution of the nonlinear objective function is found using a multi-step procedure.

30 Claims, 9 Drawing Sheets

(56) References Cited

U.S. PATENT DOCUMENTS

| | | | | |
|---|---|---|---|---|
| 5,663,929 | A * | 9/1997 | Pavone | G01V 1/48 367/82 |
| 5,745,392 | A * | 4/1998 | Ergas | G06T 9/005 708/203 |
| 6,104,982 | A * | 8/2000 | Vermeer | G01V 1/22 702/14 |
| 6,519,533 | B1 * | 2/2003 | Jeffryes | G01V 1/36 702/17 |
| 6,556,922 | B2 * | 4/2003 | Anno | G01V 1/364 702/17 |
| 6,594,394 | B1 * | 7/2003 | Stromberg | G01V 1/247 382/232 |
| 6,766,256 | B2 * | 7/2004 | Jeffryes | G01V 1/005 702/17 |
| 6,876,599 | B1 * | 4/2005 | Combee | G01V 1/364 367/21 |
| 9,513,389 | B2 * | 12/2016 | Huo | G01V 1/28 |
| 2002/0183931 | A1 * | 12/2002 | Anno | G01V 1/364 702/14 |
| 2008/0240203 | A1 * | 10/2008 | Baqai | G06K 9/40 375/130 |
| 2011/0096625 | A1 | 4/2011 | Rentsch et al. | |
| 2011/0103182 | A1 * | 5/2011 | Martin | G01V 1/3808 367/24 |
| 2012/0290214 | A1 * | 11/2012 | Huo | G01V 1/005 702/16 |
| 2013/0135965 | A1 | 5/2013 | Ji et al. | |
| 2017/0097433 | A1 * | 4/2017 | Nguyen | G01V 1/364 |
| 2017/0130574 | A1 * | 5/2017 | Nunes | G01V 1/226 |
| 2017/0176243 | A1 * | 6/2017 | Ellmauthaler | G01H 9/004 |
| 2018/0196155 | A1 * | 7/2018 | Nguyen | G01V 1/364 |
| 2019/0120044 | A1 * | 4/2019 | Langnes | G01V 1/001 |
| 2020/0217979 | A1 * | 7/2020 | Iqbal | G01V 1/366 |
| 2020/0256834 | A1 * | 8/2020 | Langnes | E21B 47/10 |
| 2020/0309976 | A1 * | 10/2020 | Khan | G01V 1/325 |

OTHER PUBLICATIONS

International Search Report and Written Opinion received for PCT Patent Application No. PCT/EP2016/081742, dated Mar. 3, 2017, 8 pages.

Mallat et al., "Matching Pursuits With Time-Frequency Dictionaries", IEEE Transactions on Signal Processing, Dec. 1993, vol. 41, Issue No. 12, pp. 3397-3415.

* cited by examiner

METHOD AND SYSTEM FOR SEPARATING BLENDED SEISMIC DATA

CROSS REFERENCE TO RELATED APPLICATIONS

This is a national stage application of International Application No. PCT/EP2016/081742, filed 19 Dec. 2016, which claims benefit of priority to US Patent Application Nos. 62/270,731, filed 22 Dec. 2015 and 62/301,805, filed 01 Mar. 2016.

FIELD OF THE INVENTION

The present invention relates to a method and system for separating blended seismic data containing overlapping data responses to interfering seismic waves generated by a plurality of sources.

BACKGROUND OF THE INVENTION

Seismic acquisition has been of vital importance for exploration of hydrocarbons, such as oil and/or natural gas, from subsurface earth formations, and it is becoming increasingly used in the context of monitoring the subsurface earth formations during production of these hydrocarbons as well.

The principle of seismic acquisition is that a seismic source is employed to induce seismic waves that propagate downwardly through the subsurface earth formation. The downwardly-propagating seismic waves are reflected by one or more geological structures within the subsurface earth formation, which act as partial reflectors for the seismic waves. It is possible to obtain information about the geological structure of the subsurface earth formation from seismic waves that undergo reflection within the subsurface earth formation and is subsequently acquired by one or more seismic sensors (generally referred to as seismic "receivers"). Reflected seismic waves are typically recorded during a so-called listening time. Longer listening times allow recording of multiple reflection events and/or reflection events that occurred deeper under the earth surface.

In the simplest form, a 2D or 3D seismic survey can be produced by actuating one source at a time, and recording the responses at one or more seismic receivers for the duration of the listening time, before actuating the same source again in a different location or a different source in a different location. In such single shot shooting architecture, earth responses corresponding to multiple shots (or source locations) do not interfere with each other.

Various specific methods for seismic acquisition have been proposed in the past, which make use of so-called simultaneous shooting of multiple seismic sources arranged in a source array. Herewith, the acquisition time (and cost) can be lowered. However, the seismic responses from multiple shots (or source locations) interfere with each other and some form of (post-acquisition) deblending of the responses is required.

US pre-grant publication No. 2013/0135965 discloses a comparative method for separating simultaneous source data, wherein multiple sources are fired (near-)simultaneously and the data received by seismic sensors is decomposed so that seismic data generated by each of the multiple sources may be determined. In the comparative method frequency diverse filtering is employed, and the deblending problem is converted into a one-norm or zero-norm optimization problem. The solution of the one-norm or zero-norm optimization problem is the deblended data. This comparative method is computationally heavy.

SUMMARY OF THE INVENTION

In accordance with a first aspect of the present invention, there is provided method for separating blended seismic data containing overlapping data responses to interfering seismic waves generated by a plurality of sources, comprising:

(a) providing a fullband gather for a receiver, which fullband gather is one of the group consisting of a common receiver gather, a common midpoint gather and a common offset gather, which fullband gather comprises a set of blended traces that contain seismic signals representing energy received from at least one cluster comprising multiple sources overlapping in time-frequency domain, wherein each source represents seismic energy that is released in the earth by one group of physical sources defined such that none of the physical sources within any selected group is overlapping with any other source within the same selected group, and wherein each physical source within a single cluster is uniquely located at its own unique position vector with respect to the receiver and fired at a known firing time;

(b) creating one or more single source gathers by iteratively separating signals of one or more selected single sources from the fullband gather, wherein performing steps b1 to b6:

(b1) selecting one source from the multiple sources of one cluster;

(b2) creating an intermediate fullband gather by subtracting from the set of blended traces of the fullband gather signals of all sources from other clusters, which have already been separated from the fullband gather in earlier iterations of performing steps b1 to b7, thereby obtaining the intermediate fullband gather consisting of intermediate blended traces;

(b3) unless the intermediate fullband gather is already source-aligned to the selected source, source-aligning the intermediate fullband gather of step b2 by cutting the blended traces in the intermediate fullband gather such that each intermediate blended trace in the intermediate fullband gather is cut to start at a time zero coincident with the firing time of the physical source belonging to the unique position vector of the blended trace associated with that source;

(b4) creating multiple subband gathers from the intermediate fullband gather by decomposing the source-aligned fullband gather from b3 into frequency subbands;

(b5) for each subband gather of the multiple subband gathers from b4 separating the signal corresponding to the one source selected in step b1 thereby creating one separated single source subband gather, by performing steps b5.1 to b5.3 until all subband gathers from the multiple subband gathers are processed;

(b5.1) one after another selecting one subband gather from the multiple subband gathers, computing non-equispaced Radon coefficients, and computing orthogonal projections of selected Radon coefficients within the selected subband gather by iteratively performing steps b5.1.1 to b5.1.5 whereby minimizing an objective function until a pre-defined first stop-criterion is met;

(b5.1.1) creating an intermediate subband gather by subtracting orthogonal projections that have already been obtained while performing steps b5.1.2 to b5.1.5 from the selected subband gather;

(b5.1.2) computing estimated Radon coefficients of the intermediate subband gather from step b5.1 by transforming the intermediate subband gather into a Radon domain using a non-equispaced Radon transformation, thereby producing a collection of estimated Radon coefficients;

(b5.1.3) selecting a number of the estimated Radon coefficients, wherein each of the selected estimated Radon coefficients have a higher amplitude than each of the non-retained estimated Radon coefficients within the collection of estimated Radon coefficients;

(b5.1.4) computing orthogonal projections of exclusively the selected estimated Radon coefficients from step b5.1.3;

(b5.1.5) going back to step b5.1.1 until the pre-defined first stop-criterion is met;

(b5.2) creating the separated single source subband gathers by recalculating the orthogonal projections by interpolating to a regular grid of source positions;

(b5.3) going back to step b5.1 until all subband gathers from the multiple subband gathers are processed;

(b6) creating the one or more single source gathers in fullband by reconstructing the fullband gather from the separated single source subband gathers.

In accordance with a second aspect of the invention, there is provided a system method for separating blended seismic data containing overlapping data responses to interfering seismic waves generated by a plurality of sources, comprising:

a computer readable storage medium on which is stored a fullband gather for a receiver, which fullband gather is one of the group consisting of a common receiver gather, a common midpoint gather and a common offset gather, which fullband gather comprises a set of blended traces that contain seismic signals representing energy received from at least one cluster comprising multiple sources overlapping in time-frequency domain, wherein each source represents seismic energy that is released in the earth by one group of physical sources defined such that none of the physical sources within any selected group is overlapping with any other source within the same selected group, and wherein each physical source within a single cluster is uniquely located at its own unique position vector with respect to the receiver and fired at a known firing time;

a computer processor operatively coupled to the computer readable storage medium and programmed to create one or more single source gathers by iteratively separating signals of one or more selected single sources from the fullband gather, wherein performing steps b1 to b6:

(b1) selecting one source from the multiple sources of one cluster;

(b2) creating an intermediate fullband gather by subtracting from the set of blended traces of the fullband gather signals of all sources from other clusters, which have already been separated from the fullband gather in earlier iterations of performing steps b1 to b7, thereby obtaining the intermediate fullband gather consisting of intermediate blended traces;

(b3) unless the intermediate fullband gather is already source-aligned to the selected source, source-aligning the intermediate fullband gather of step b2 by cutting the blended traces in the intermediate fullband gather such that each intermediate blended trace in the intermediate fullband gather is cut to start at a time zero coincident with the firing time of the physical source belonging to the unique position vector of the blended trace associated with that source;

(b4) creating multiple subband gathers from the intermediate fullband gather by decomposing the source-aligned fullband gather from b3 into frequency subbands;

(b5) for each subband gather of the multiple subband gathers from b4 separating the signal corresponding to the one source selected in step b1 thereby creating one separated single source subband gather, by performing steps b5.1 to b5.3 until all subband gathers from the multiple subband gathers are processed;

(b5.1) one after another selecting one subband gather from the multiple subband gathers, computing non-equispaced Radon coefficients, and computing orthogonal projections of selected Radon coefficients within the selected subband gather by iteratively performing steps b5.1.1 to b5.1.5 whereby minimizing an objective function until a pre-defined first stop-criterion is met;

(b5.1.1) creating an intermediate subband gather by subtracting orthogonal projections that have already been obtained while performing steps b5.1.2 to b5.1.5 from the selected subband gather;

(b5.1.2) computing estimated Radon coefficients of the intermediate subband gather from step b5.1 by transforming the intermediate subband gather into a Radon domain using a non-equispaced Radon transformation, thereby producing a collection of estimated Radon coefficients;

(b5.1.3) selecting a number of the estimated Radon coefficients, wherein each of the selected estimated Radon coefficients have a higher amplitude than each of the non-retained estimated Radon coefficients within the collection of estimated Radon coefficients;

(b5.1.4) computing orthogonal projections of exclusively the selected estimated Radon coefficients from step b5.1.3;

(b5.1.5) going back to step b5.1.1 until the pre-defined first stop-criterion is met;

(b5.2) creating the separated single source subband gathers by recalculating the orthogonal projections by interpolating to a regular grid of source positions;

(b5.3) going back to step b5.1 until all subband gathers from the multiple subband gathers are processed;

(b6) creating the one or more single source gathers in fullband by reconstructing the fullband gather from the separated single source subband gathers; and an output device operatively coupled to the computer processor and configured to output the one or more single source gathers created in step b6.

The invention will be further illustrated hereinafter by way of example only, and with reference to the non-limiting drawing.

In each of FIGS. 4, 5, 8, 11, and 12 panel (a) shows an original unblended data in the t-x domain (the true solution), panel (b) shows the deblended data in the t-x domain, and panel (c) shows the separation error calculated by subtracting the separated data (of panel (b)) from the original unblended data (of panel (a)). Panels (d), (e) and (f) respectively show the original unblended gather, the deblended gather and the separation error in the f-k domain.

Figure 2:
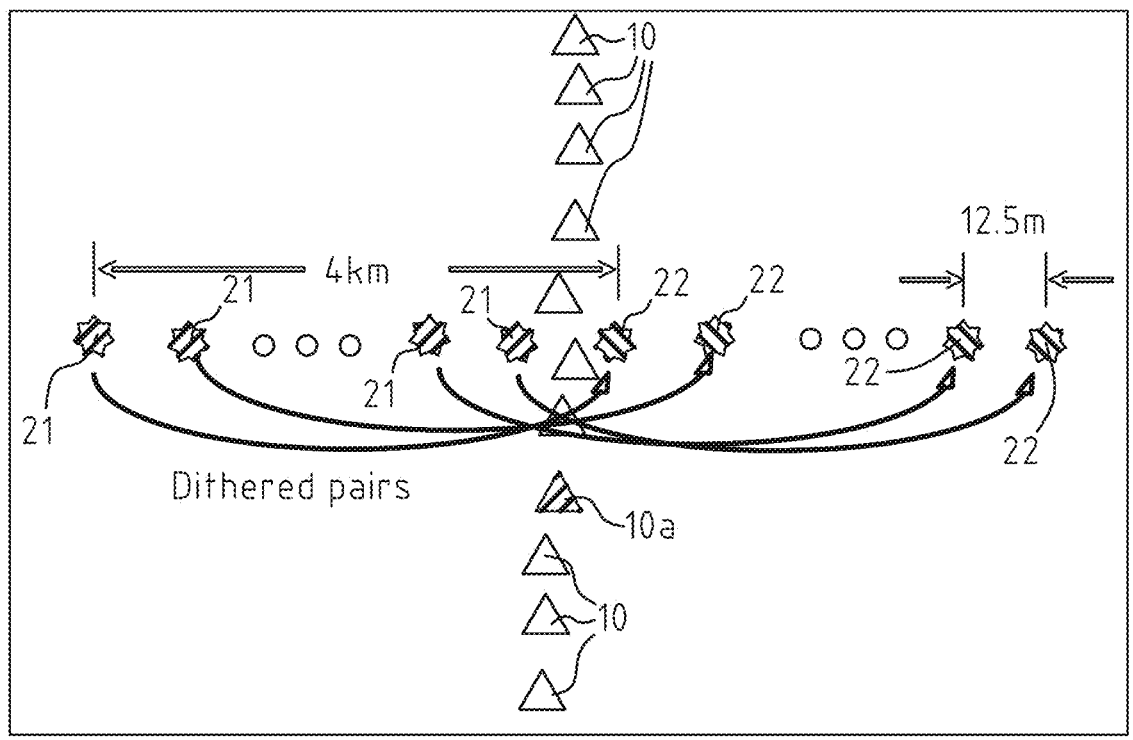
FIG. 2 shows a cross-spread land field geometry of simulated simultaneous sources with dithering delay time.
Figure 6:
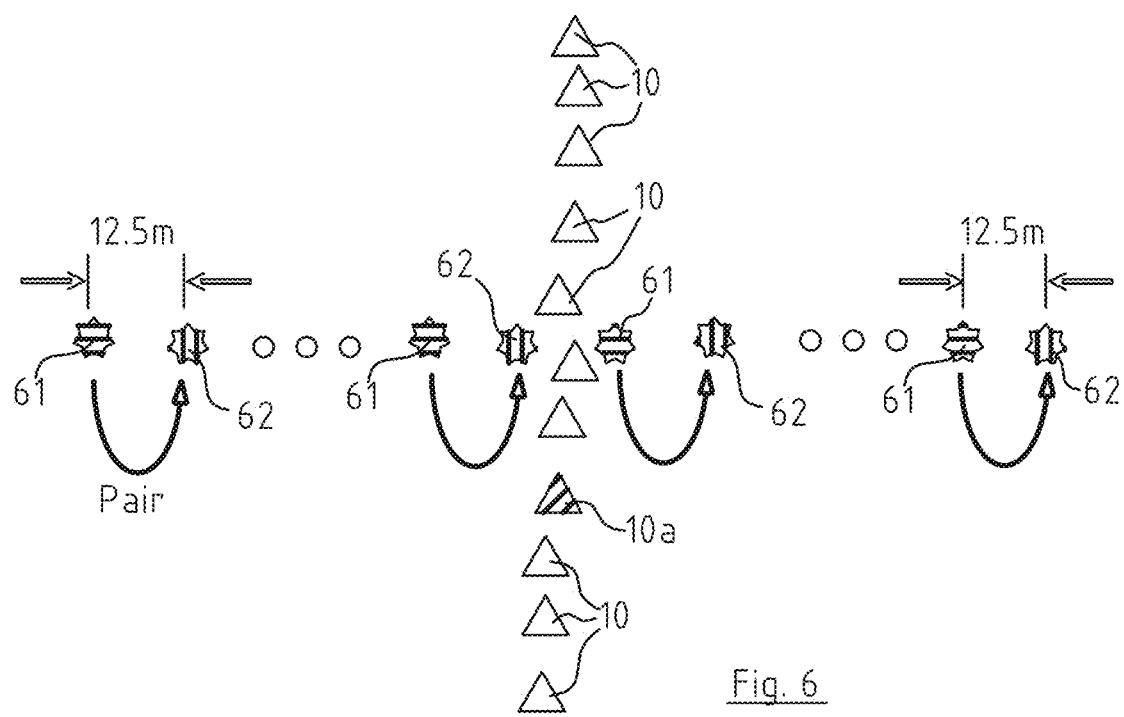
FIG. 6 shows a cross-spread land field geometry of simulated simultaneous sources with zero dithering.
Figure 9:
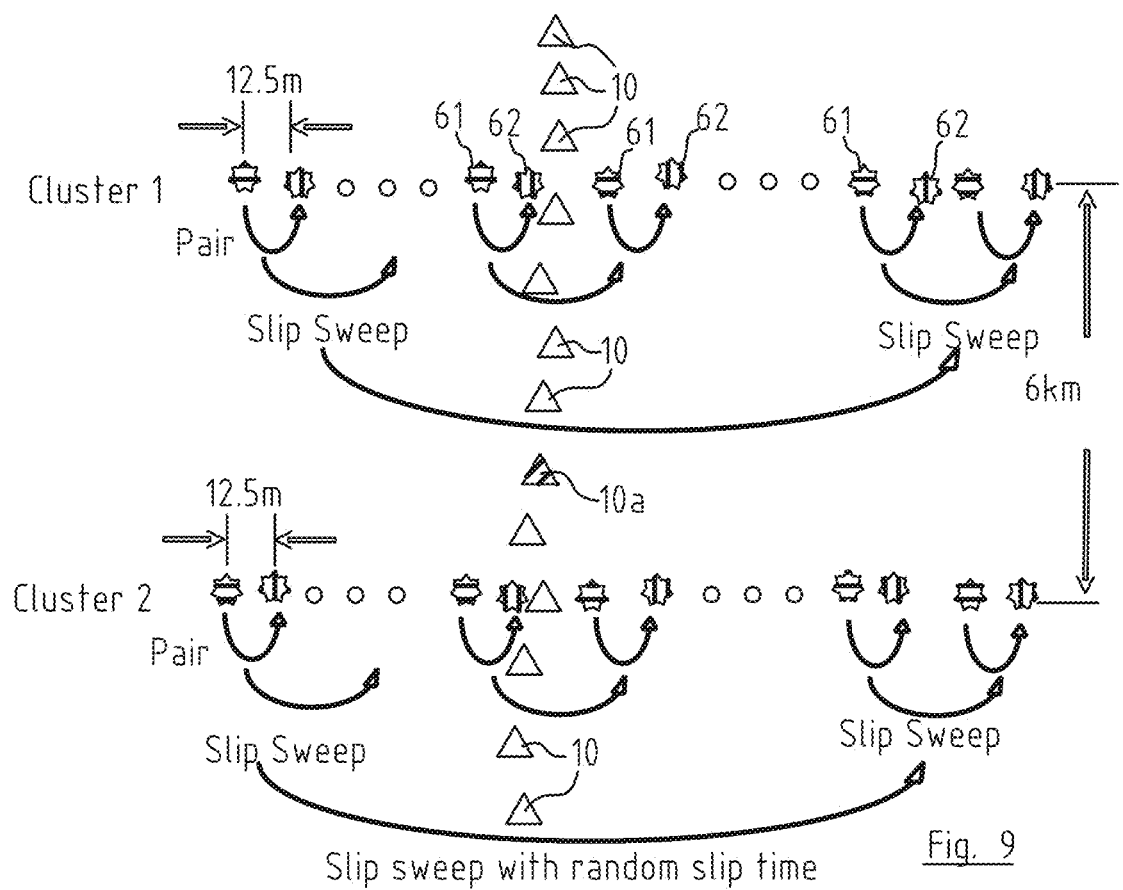
FIG. 9 shows a cross-spread land field geometry employing two clusters of simulated simultaneous sources with zero dithering operating in slip-sweep operating mode.

FIGS. 2, 6, and 9 are not to scale. Identical reference numbers used in different figures refer to similar components.

The person skilled in the art will readily understand that, while the invention is illustrated making reference to one or more a specific combinations of features and measures, many of those features and measures are functionally independent from other features and measures such that they can be equally or similarly applied independently in other embodiments or combinations.

DETAILED DESCRIPTION OF THE INVENTION

The present disclosure involves separating of blended seismic data that contains overlapping data responses to interfering seismic waves generated by a plurality of simultaneous seismic sources. In this context "interfering seismic waves" means that respective wave fields having been emitted by multiple physical seismic energy sources such as vibrators into the earth formation are mutually interfering in the time-frequency domain. Only interference of the fundamental frequency is considered. Interference involving harmonics is disregarded for this definition.

The blended data is comprised in a fullband gather which contains overlapping data responses to interfering seismic waves generated by a cluster comprising a plurality of sources. The fullband gather is one of a common-midpoint gather, a common receiver gather, and a common-offset gather.

In the context of this description, a "fullband gather" represents a collection of traces sorted from recorded seismic data which traces are associated with a cluster of sources. The cluster comprises a plurality of sources.

A "source" is the aggregate of seismic energy in the earth released by one single group consisting of a plurality of physical sources, defined such that none of the physical sources within the group is overlapping with any other source within the same group. In practice, this can be achieved by for instance operating the physical sources in a slip sweep mode or in a flip-flop mode. However, physical sources belonging to different groups can induce seismic waves in the earth that overlap with seismic waves from other physical sources belonging to other groups. Thus, one "source gives" rise to multiple traces in one selected single gather.

In this context, the seismic waves are said to "overlap" if they interfere with each other in time-frequency domain. Such interfering wavefields give rise to blended seismic signals in a common receiver. When reference is made to "interfering wavefields" in the time-frequency domain, only interference of the fundamental frequency is considered. Interference involving harmonics is disregarded for this purpose.

"Blended traces" are traces in a gather that contain seismic signals representing energy received from comprises multiple sources overlapping in time-frequency domain. Two or more of these multiple sources may together represent a single shot line, or cluster, which is sorted in the gather.

The term "common" in "common receiver" in the context of this disclosure means "shared". The blended signals from multiple actual sources are recorded in a shared receiver.

The term "simultaneous" in the present description is not used exclusively for synchronized sources, which are fired at exactly the same time, but for any plurality of sources that cause interfering seismic waves. The presently proposed method can be applied to separate the simultaneous sources acquired with dithering, and it can also be applied to separate sources simultaneously fired with fixed delay time without dithering (including synchronized sources). In the latter case certain assumptions are made which generally work best when the sources sample the same geological features in the earth.

In this disclosure a non-equispaced subband Radon transform is proposed, whereby the deblending problem is solved on a source-by-source and subband-by-subband basis by minimizing a nonlinear objective function. The deblending is performed one source after another, and can be done for any number of sources represented in the blended data, or until all sources are processed. The deblending of the responses from each source from the fullband gather is done with an iterative process, wherein the fullband gather is decomposed in multiple subbands, and wherein the decomposed data in each of the multiple subbands is transformed into the Radon domain using a non-equispaced (non-uniform) Radon transformation.

Model vectors of Radon coefficients are determined (estimated) by fitting multiple traces in a frequency-space domain within frequency subbands. One benefit of analyzing the data by fitting model vectors within subbands is that the most dominant contributions within each subband are not overshadowed by dominant frequencies from other frequency subbands. This way, a larger bandwidth of features will be represented in the reconstructed single source gathers.

The deblending can thus have at least two levels of iteration.

An inner level of iteration is used to determine the model vectors of the Radon coefficients in an iterative approach subband by subband. In each subband, firstly the most dominant Radon coefficients are estimated. Orthogonal projections based on these Radon coefficients are calculated on a frequency-by-frequency basis and then subtracted from the decomposed subband data.

This can be done subband by subband until the source under consideration has been separated in each of the subbands. These results can then be combined to reconstruct the single source gathers in fullband.

An outer level of iteration is used to refine the single source gathers making, by subtracting the best available estimates of the other single source gathers from the part of the fullband gather that is being deblended.

The Radon coefficients can be calculated in time domain or in frequency domain. In time domain, the fullband gathers can be decomposed into subbands in time domain using known filter banks, before applying the non-equispaced Radon transform. In the frequency domain, a frequency domain subband decomposition filter may be used. In general, applicant has found it is more accurate and computationally more efficient to compute the Radon coefficients in the frequency domain rather than in the time domain. The method casts the deblending process as minimising a non-linear objective function.

Figure 1:
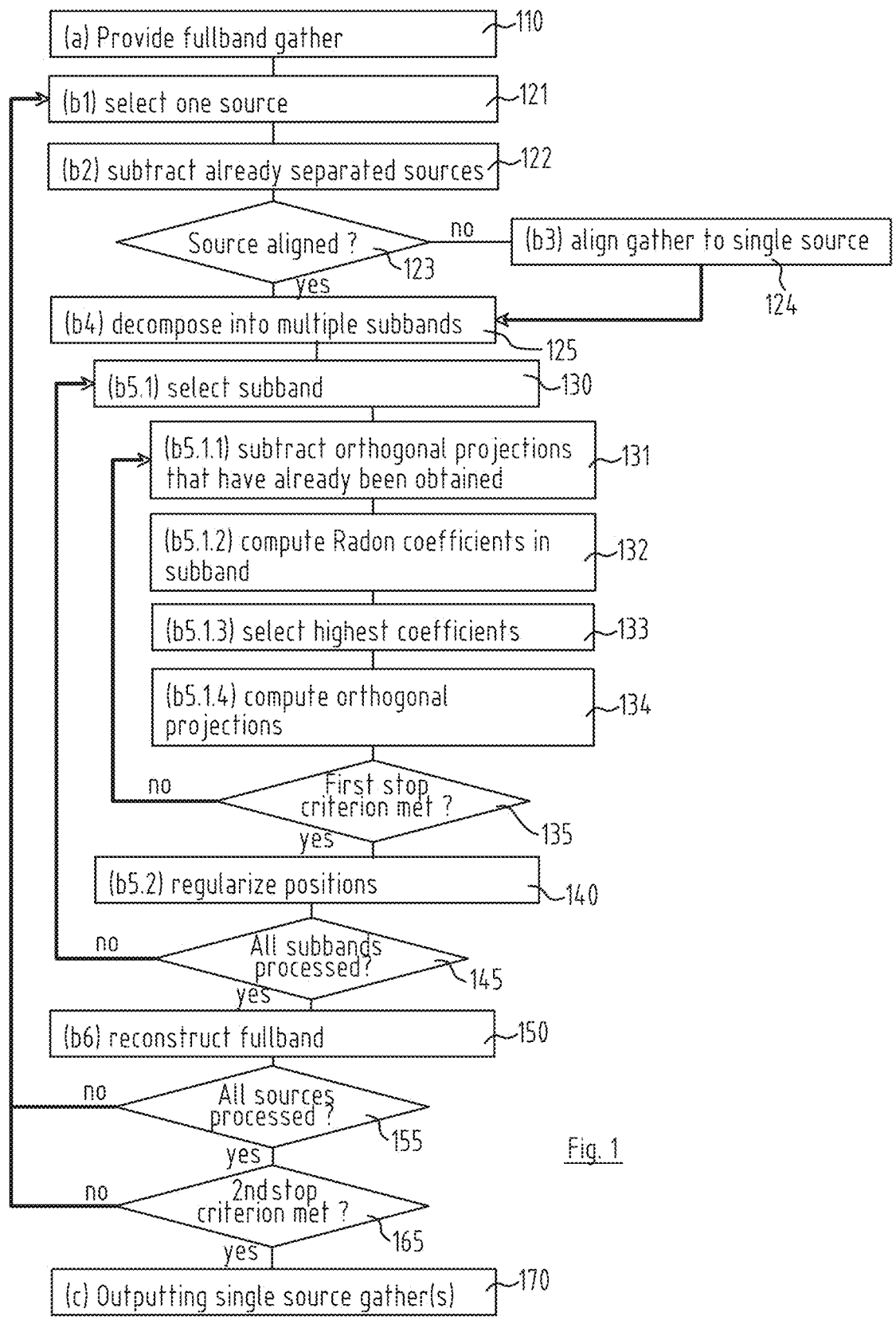
FIG. 1 shows a flow chart of an embodiment of the workflow.

An embodiment of a workflow encompassing this method is schematically shown in the flowchart of FIG. 1.

First in step a, illustrated at 110, a fullband gather for a receiver is provided. The fullband gather comprises a set of blended traces that contain seismic signals representing energy received from at least one cluster comprising multiple sources overlapping in time-frequency domain. Each source represents seismic energy that is released in the earth by one group of physical sources. Each physical source within a single cluster is uniquely located at its own unique position vector with respect to the receiver and fired at a known firing time.

Then one or more single source gathers are created by iteratively separating signals of one or more selected single sources from the fullband gather. This is done source-by-source. The iteration steps are suitably performed with a computer processor.

In step (b1), illustrated at 121, one source is selected from the multiple sources of one cluster. For that source, in step (b2), an intermediate fullband gather is created by subtracting from the set of blended traces of the fullband gather signals of all sources from other clusters, which have already been separated from the fullband gather in earlier iterations. This step is illustrated at 121. The intermediate fullband gather consisting of intermediate blended traces is herewith obtained. If the intermediate fullband gather is already source-aligned to the selected source, then according to decision 123 the procedure can skip step b3. Otherwise, the step b3 of source-aligning the intermediate fullband gather should be performed. Typically, the blended traces in the intermediate fullband gather are cut such that each intermediate blended trace in the intermediate fullband gather is cut to start at a time zero coincident with the firing time of the physical source belonging to the unique position vector of the blended trace associated with that source. This is illustrated at 124. Step b4, illustrated at 125, is to create multiple subband gathers from the intermediate fullband gather by decomposing the source-aligned fullband gather frequency subbands. The subbands collectively should cover all signal frequencies in the gather, but there may be overlap. The invention is not limited to any particular number of subbands, but typically any number between 4 and 40 subbands are expected provide decent results.

For each subband the signal corresponding to the one source selected in step b1 is separated. This is done iteratively in each subband. First one subband is selected in step b5.1, illustrated at 130, and the corresponding subband gather is taken from the decomposed data. In step b5.1.1, illustrated at 131, an intermediate subband gather is created by subtracting orthogonal projections that have already been obtained from the selected subband gather. In step b5.1.2, illustrated at 132, Radon coefficients of the intermediate subband gather are computed. This step includes transforming the intermediate subband gather into a Radon domain using a non-equispaced Radon transformation. From the collection of estimated Radon coefficients that is produced, the highest coefficients are selected in step b5.1.3 as illustrated at 133. This can be any percentage (or fraction) of the total number of estimated Radon coefficients. Each of the selected estimated Radon coefficients will have a higher amplitude than each of the non-retained estimated Radon coefficients. For only the selected coefficients, orthogonal projections are calculated in step b5.1.4 as illustrated at 134. These orthogonal projections will be subtracted from intermediate subband gather in step b5.1.1 to repeat the procedure of further minimizing the objective function. This procedure will be continued until a first stop criterion is met, as illustrated at 135. The stop criterion may be that a first residual in the objective function, or a change in the first residual, is less than a pre-determined first maximum. Instead, the first stop criterion may also be simply a pre-determined first number of iterations. It is conceived that typically between 50 and 100 iterations yield satisfactory results, but deviations from this interval are possible.

Once the first stop criterion has been met, the orthogonal projections can be recalculated to regularize the shot positions. This is done at step b5.2 illustrated at 140. The procedure is then repeated until all subbands have been processed, as illustrated at 145. Then in step b6, illustrated at 150, the one or more single source gathers can be created in fullband by reconstructing the fullband gather from the separated single source subband gathers. This entire procedure can be done for as many sources as desired until all sources are processed, as illustrated at 155.

Optionally, after this process has been done for all desired sources, the end result can be compared to a pre-determined second stop criterion, to decide whether to redo the entire process again. This is illustrated at decision 165. The pre-defined second stop-criterion may be that a second differential between a modelled fullband gather reconstructed from the separated single source gathers and the fullband gather originally provided in step a is less than a pre-determined second maximum. Alternatively, the pre-determined second stop criterion may be given by a pre-determined second number of iterations.

Finally, the one or more single source gathers obtained from the above procedure may be outputted to an output device, as illustrated at 170. A non-limiting list of examples of output devices includes: a computer monitor, a television, a cathode ray tube, an LCD screen, a plasma screen, a projector, a plotter, a printer, and the like. The output device provides a tangible output that can be interpreted by a user.

The method will now be further explained with help of specific examples.

Example A: Separating Dithered Sources

The proposed deblending method can be applied to separate any number of sources. However, to simplify the description without loss of generality, we first suppose that we have two simultaneous sources, denoted as $S_1$ and $S_2$. Assume that $S_1$ and $S_2$ are fired with an independent random timing delay, denoted as $T^{(1)}$ and $T^{(2)}$, and the random timing delays for $S_1$ and $S_2$, $T^{(1)}$ and $T^{(2)}$, are known for each trace.

A collection of traces as described above is considered, whereby the values of $T^{(1)}$ and $T^{(2)}$ are random. In the application of separating the simultaneously acquired field data, the collection of traces should be a common-midpoint gather, a common-receiver or a common-offset gather. Assume that each trace in the gather can be located with respect to $S_1$ and $S_2$ using scalar quantities, $x_i^{(1)}$ and $x_i^{(2)}$, wherein the subscript denotes the trace number in the gather and superscript denotes the sources. Similarly, $T_i^{(1)}$ denotes the firing time of $S_1$ for the $i^{th}$ trace, $T_i^{(2)}$ denotes the firing time of $S_2$ for the $i^{th}$ trace. The recorded data for the $i^{th}$ trace is denoted by $d_i(t)$, and random noise for the $i^{th}$ trace is denoted by $n_i(t)$. Suppose that there are N traces in the gather (N being a natural number, and more than one). The N seismic traces do not need to be regularly sampled. The blended data can be written as $$\begin{pmatrix} s_1^{(1)}(t) \\ s_2^{(1)}(t) \\ \vdots \\ s_N^{(1)}(t) \end{pmatrix} + \begin{pmatrix} \delta(t - T_1^{(2)} + T_1^{(1)}) & 0 & \cdots & 0 \\ 0 & \delta(t - T_2^{(2)} + T_2^{(1)}) & \cdots & 0 \\ \vdots & \vdots & \ddots & \vdots \\ 0 & 0 & \cdots & \delta(t - T_N^{(2)} + T_N^{(1)}) \end{pmatrix}$$

$$\begin{pmatrix} s_1^{(2)}(t) \\ s_2^{(2)}(t) \\ \vdots \\ s_N^{(2)}(t) \end{pmatrix} = \begin{pmatrix} d_1(t) \\ d_2(t) \\ \vdots \\ d_N(t) \end{pmatrix} + \begin{pmatrix} n_1(t) \\ n_2(t) \\ \vdots \\ n_N(t) \end{pmatrix}$$

wherein the symbol $\delta$ is used to represent a Dirac delta function. Equation (1) can be written in matrix form as $$S^{(1)}(t) + B(t)S^{(2)}(t) = d(t) + n(t) \quad (2)$$

The deblending process is to recover the single source signals $S^{(1)}(t)$ and $S^{(2)}(t)$, which are respectively induced by sources $S_1$ and $S_2$, from Equation (1) or (2).

Equation (1) has only N number of equations, but has 2N unknowns. Therefore some extra constraints have to be defined in order to have a unique solution. The coherence and the sparsity of seismic events in time and space may be used in the deblending process. The Radon transform is used to represent the coherencies of seismic events.

The proposed deblending method is based on the coherency of the seismic events. It uses a non-equispaced subband Radon transform to transform the data from time-space domain into the Radon domain. The transformed values are the so-called Radon coefficients.

If the Radon transform is calculated in the time domain, the data is suitably decomposed into subbands in the time domain by filter banks before applying the non-equispaced subband Radon transform.

If the non-equispaced subband Radon transform is computed in the frequency domain, which is preferred, then a frequency domain subband decomposition filter is used to decompose the linear time invariation (LTI) system into multiple subbands. In general, it is more accurate and more efficient to compute the Radon coefficients in the frequency domain rather than in the time domain.

In the remainder of this Example, the non-equispaced subband Radon transform is computed in the frequency domain. Each trace can be located relative to the receiver location using scalar quantities $x_1, x_2, \ldots, x_N$. The trace located at $x_i$ is denoted as $d_i(t, x_i)$, and can be modelled as a superposition of events with a move-out which is a function of $x_i$:

$$d_i(t, x_i) = \sum_{k=1}^{N_p} \sum_{l=1}^{N\tau} m(p_k, \tau_l) \quad (3)$$

where $m(p_k, \tau_l)$ represent the Radon coefficients, $p_k$ is the slowness, $\tau_l$ is the intercept time, Np the number of slowness indices k used to define slowness vector p, and $N\tau$ is the number of intercept time indices l used in the intercept time vector $\tau$. The Radon coefficients $m(p_k, \tau_l)$ in Equation (3) are associated with an assumed Radon integration path usually denoted with the function $u(t, p_k, x_i)$, which could be a linear function or a hyperbolic function of $x_i$. In practice, since a relatively small spatial window is used, a linear function is a sufficient good approximation to any type of seismic event. For a linear function, $u(t, p_k, x_i)$ can be expressed as $$u(t, p_k, x_i) = t - p_k x_i. \quad (4)$$

Equation (3) is the non-equispaced subband Radon transform in time-space domain if the input data has been decomposed into multiple subbands and the $d_i(t, x_i)$ in Equation (3) represents one subband of those decomposed subbands. If the Radon coefficients are computed by using Equation (4), the input data should be interpolated in time in order to have accurate Radon coefficients. It is considered to be more accurate and computationally more convenient to transform Equation (3) into frequency domain. Taking Fourier transform with respect to the temporal variable t, the Radon transform at frequency f is rewritten as $$d_i(f, x_i) = \sum_{k=1}^{N_p} \sum_{l=1}^{N\tau} m(p_k, \tau_l) e^{-j2\pi f(p_k x_i + \tau_l)}. \quad (5)$$

The values of the frequency f in Equation (5) are frequencies within the subband. Equation (5) can be written in matrix form as well:

$$d(f) = R(f) m(f) \quad (6)$$

wherein $d(f) = (d_1(f)\ d_2(f)\ \ldots\ d_M(f))^T$ is the data vector, and $R(f)$ is the matrix of the Radon operator $$R(f) = \begin{pmatrix} e^{-j2\pi f(p_1 x_1 + \tau_1)} & e^{-j2\pi f(p_2 x_1 + \tau_2)} & \cdots & e^{-j2\pi f(p_{Np} x_1 + \tau_{N\tau})} \\ e^{-j2\pi f(p_1 x_2 + \tau_1)} & e^{-j2\pi f(p_2 x_2 + \tau_2)} & \cdots & e^{-j2\pi f(p_{Np} x_2 + \tau_{N\tau})} \\ \vdots & \vdots & \ddots & \vdots \\ e^{-j2\pi f(p_1 x_N + \tau_1)} & e^{-j2\pi f(p_2 x_N + \tau_2)} & \cdots & e^{-j2\pi f(p_{Np} x_N + \tau_{N\tau})} \end{pmatrix} \quad (7)$$

and $m(f)$ is the vector of Radon coefficients at frequency f. It should be noted that in this description a superscript T directly following a matrix is used to indicate the transpose of the matrix. In the application of deblending the simultaneously acquired data, Equation (6) is often underdetermined, which means there are usually more coefficients than data. The minimum norm solution of Equation (6) can be computed as $$m = R^H (R R^H)^{-1} d \quad (8)$$

wherein superscript H is used to denote a Hermitian transpose of the matrix R.

In the proposed deblending method, the subband Radon coefficients $m(p_k, \tau_l)$ are preferably calculated in the frequency domain. The computation of the inverse matrix in Equation (8) is expensive particularly when the model space becomes large at the subbands with high frequencies. However instead of computing the minimum norm solution of Equation (8), it is presently conceived to compute the projection of data to the Radon operators expressed as $$m = R^H d. \quad (9)$$

The coefficients $m(p_k, \tau_l)$ may be calculated with the following steps:

1) transform the data $d_i(t,x_i)$ into frequency domain $d_i(f,x_i)$;
2) compute the Radon coefficients at each frequency m(f) using Equation (9); and
3) transform the coefficients back to the time domain.

In the proposed deblending method, for the sake of computation efficiency, step 3) is carried out at the last step of the separation process, because the followed processes, such as orthogonal projection process and the regularisation process, are implemented in the frequency domain.

To explain the separation process of one source a subband, an abbreviated notation is used for reasons of clarity, to define the data vector d(t) at t as $d(t)=(d_1(t) \ldots (d_N(t))^T$ and to define the blending matrix of the source $S_k$ at t as $$B^{S_k}(t) = \begin{pmatrix} \delta(t-T_1^{(k)}) & 0 & \ldots & 0 \\ 0 & \delta(t-T_2^{(k)}) & \ldots & 0 \\ \vdots & \vdots & \ddots & \vdots \\ 0 & 0 & \ldots & \delta(t-T_N^{(k)}) \end{pmatrix} \quad (10)$$

As before, a number Np of slowness indices is used in the slowness vector, $p=(p_1 \ldots p_{Np})^T$, and a number Nτ of intercept time indices in the intercept time vector, $\tau=(\tau_1 \ldots \tau_{N\tau})^T$, for the non-equispaced Radon transform associated with the source $S_k$. When the coefficients vector m is denoted as $m^{S_k}=(m^{S_k}(p_1,\tau_1) \ldots m^{S_k}(p_{Np},\tau_{N\tau}))^T$, then the matrix of Radon operators $R^{S_k}(t)$ at t associated with the source $S_k$ can be written as:

$$R^{S_k}(t) = \begin{pmatrix} R^{S_k}(t, p_1, \tau_1, x_1^k) & R^{S_k}(t, p_1, \tau_2, x_1^k) & \ldots & R^{S_k}(t, p_{Np}, \tau_{N\tau}, x_1^k) \\ R^{S_k}(t, p_1, \tau_1, x_2^k) & R^{S_k}(t, p_1, \tau_2, x_2^k) & \ldots & R^{S_k}(t, p_{Np}, \tau_{N\tau}, x_2^k) \\ \vdots & \vdots & \ddots & \vdots \\ R^{S_k}(t, p_1, \tau_1, x_N^k) & R^{S_k}(t, p_1, \tau_2, x_N^k) & \ldots & R^{S_k}(t, p_{Np}, \tau_{N\tau}, x_N^k) \end{pmatrix} \quad (11)$$

wherein $$R(t,x,p,\tau)=\delta(t-\tau-px) \quad (12)$$

The data d(t), Equation (11) and Equation (12) are transformed into frequency domain by a Fourier transform. When a number of $N_f$ of time frequencies are used in the subband, the deblending problem of the source $S_k$ in each subband can then be expressed as minimising the following nonlinear objective function $$J = \sum_{i=1}^{Nf} \|d(f_i) - B^{S_k}(f_i)R^{S_k}(f_i)W^{S_k}m^{S_k}\|_2^2 \quad (13)$$

where $W^{S_k}$ is a frequency independent weighting matrix used to control the sparsity of the model or to enhance the coherence of seismic events. The weighting matrix $W^{S_k}$ depends on the model $m^{S_k}$ itself. Only one source is being modelled in Equation (13), which helps to limit the number of unknowns compared to e.g. the frequency diverse filtering approach of US pre-grant publication No. 2013/0135965. Cross talk between sources is also kept under control this way.

An iterative re-weighting process may suitably be used to solve the optimisation problem of Equation (13). However, the computation of the iterative re-weighting process can be prohibitively expensive particularly at subbands with high frequencies where the model space is large. Therefore, an alternative iterative procedure is proposed to approximately solve the optimisation problem of Equation (13). It works as follows:

1) Remove the random firing timing delay of the source;
2) Compute the Radon coefficients using the non-equispaced subband Radon transform as described above;
3) Select a percentage of models with the most significant coefficients;
4) Compute the orthogonal projection of models selected in Step 3);
5) Subtract the orthogonal projection computed in Step 4) from the data; and
6) Repeat from Step 2) to Step 5) until a first stop criterion is met.

The proposed procedure is similar to a matching pursuit algorithm. Reference is made to an article "Matching pursuit with time-frequency dictionaries" by S. Mallat and Z. Zhang, from IEEE Transactions on Signal Processing, Volume 41, pp. 3397-3415 (1993) for a description of matching pursuit and its variations. The models that decompose the data most significantly are selected in Step 3), and the orthogonal projections (which will be described in more detail below) are computed in Step 4).

The orthogonal projection is to approximately compute the weighting matrix $W^{S_k}$ in Equation (13). The orthogonal projection can be carried out in the time domain. However, it is more accurate and more efficient to be carried out in the frequency domain. In the following, the equations are given in the frequency domain.

Suppose that Nm number of models have been selected in the Step 3) of the procedure described above, and the Radon parameters of those selected models are $((p_1,\tau_1) (p_2,\tau_2) \ldots (p_{Nm},\tau_{Nm}))$. The orthogonal projections of those selected models are computed by minimising the following objective function $$J_{op}=\|d(f)-B(f)R_{op}(f)m_{op}(f)\|_2^2 \quad (14)$$

where B(f) is the blending matrix associated with the source, and the B(f) is an identity matrix since the random firing delay timing has been removed in Step 1), $R_{op}(f)$ is the Radon operators computed by using the selected Radon parameters, and $m_{op}(f)$ is the orthogonal projections of those selected models. Differentiating $J_{op}$ with respect to $m_{op}(f)$, the optimal solution of Equation (14) is written as $$m_{op}(f)=(R_{op}^H R_{op})^{-1} R_{op}^H d \quad (15)$$

The weighting matrix $W^{S_k}$ in Equation (13) is approximately solved by this frequency-by-frequency orthogonal projection:

$$m_{op}(f) \approx W^{S_k}(f) m^{S_k} \quad (16)$$

An advantage of applying the orthogonal projection process frequency-by-frequency is that any spectrum variations are corrected for across the frequencies.

The deblending algorithm method described in this Example can be used to separate one source from the cluster of blended data. For separating all sources, the method is expanded as follows:
1) Initialise the Radon coefficients associated with each source with zeros;
2) Subtract all sources separated from the previous iteration except the source under separation from the blended data;
3) Apply the separation method described so far;
4) Update the Radon coefficients associated with the source under separation; and 5) Repeat Step 2), 3) and 4) until a second stop criterion is met.

The method works by virtue of the coherence of the seismic signals. The firing time for other sources randomises the seismic signals from the other sources. Therefore the level of randomness of the firing timing delay is a factor to the success of separation. The accuracy of the separated source in Step 3) is iteratively improved because the spiky interference from other sources is iteratively reduced.

Seismic signals are typically irregularly (and sparsely) sampled along spatial coordinates. This is often caused by the presence of obstacles, no-permit areas, feathering, and dead traces and by economics. The irregularity of seismic signals leads to suboptimal processing and imaging results. In the deblending process described above, the seismic signals associated with each source have been decomposed by their corresponding Radon operators. By specifying the regular spatial grid, the regularised seismic signals associated with each source can be computed as $$d_{reg}^{S_k}(f) = B^{S_k}(f) R_{reg}^{S_k}(f) m^{S_k}(f) \quad (17)$$

where $d_{reg}^{S_k}(f)$ is the deblended and regularised seismic signals associated with source $S_k$, $R_{reg}^{S_k}(f)$ is the matrix of the Radon operators at the regular spatial grid, and $m^{S_k}$ is the Radon coefficients associated with source $S_k$.

To demonstrate the deblending method described herein, a data simulation test has been done. A simulation data set has been generated using a land cross-spread field shooting geometry shown in FIG. 2, based on simulated simultaneous sources with dithering delay time. Each gather contains data from a cluster of sources. The cluster comprises a plurality of sources, each source comprising a plurality of physical sources arranged in a shot line. The shot line is 8 km long with 12.5 m nominal shot interval. The sources respectively comprise one vibrator from a plurality of dithered vibrator pairs, each defined by an "odd" vibrator and an "even" vibrator. One source consists of an entire group of "odd" vibrators 21 (indicated by forward slanted hatching) and the other source of the entire group of "even" vibrators 22 (indicated by backward slanted hatching). It can be seen that each physical source of one of the groups exclusively forms a pair with exclusively one physical source in another one of the groups, whereby every physical source in the one of the groups is paired up with one unique physical source in the other one of the groups. In this simulated data example, the two vibrators in each pair are 4 km apart from each other.

The physical sources in each pair are fired with a dithered timing delay between the physical sources in the pair. One vibrator of each pair is vibrating regularly in time. The random vibrating time for the second vibrator with respect to the vibrating time of the first vibrator is varying between 0 and 600 ms.

Figure 3:
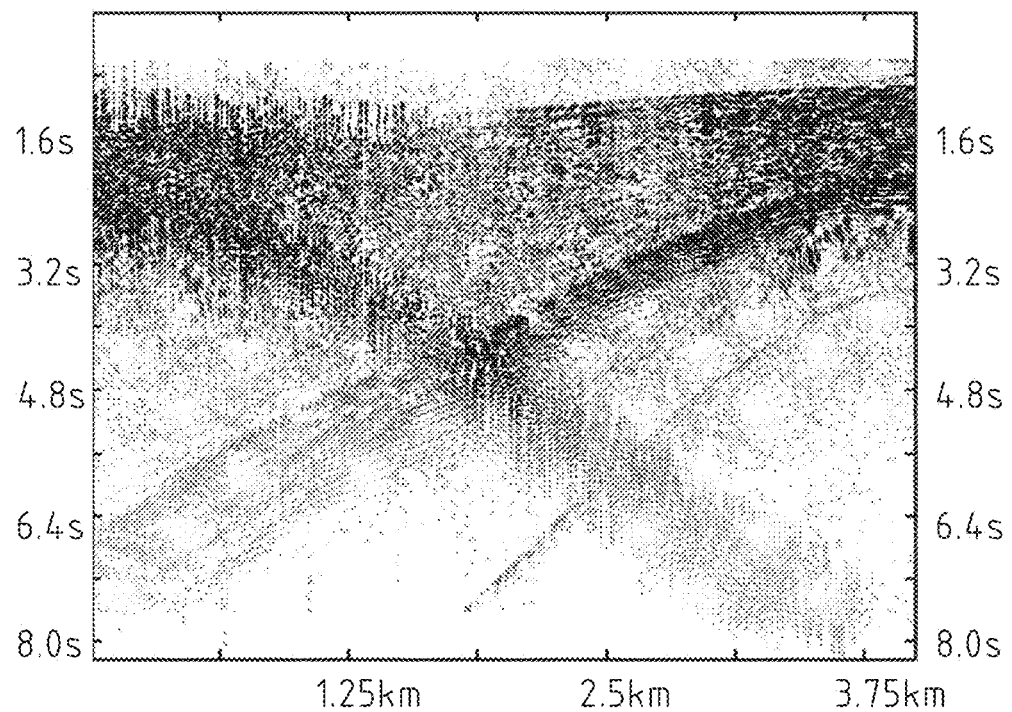
FIG. 3 shows a common receiver gather from the simulated simultaneous sources with dithering from the shooting geometry shown in FIG. 2.

FIG. 3 shows a common receiver gather sorted from the simulated blended data. The coherent events observed in FIG. 3 are seismic signals from the vibrator which is vibrating regularly, while the incoherent events are seismic signals from the vibrator which is vibrating with random timing delay. The x-axis only spreads over half of the shot line because the data for the other half of the shot line is blended in with the data for the first half.

Figures 4A, 4B, 4C:
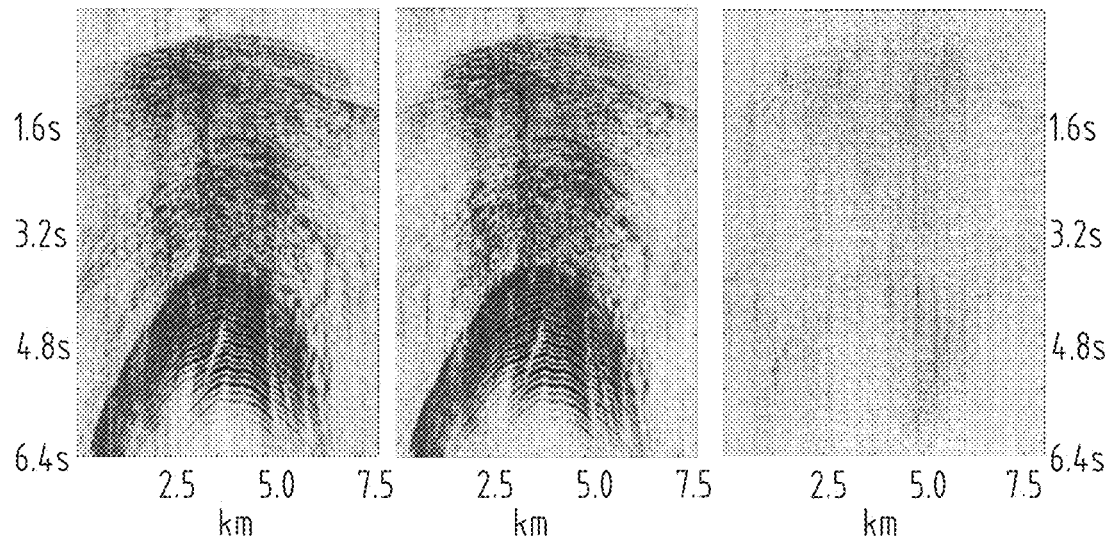
FIG. 4 (panels a to f) shows comparisons of the deblending result of the data from FIG. 3, against an unblended gather simulated with a single shooting scheme.
Figures 4D, 4E, 4F:
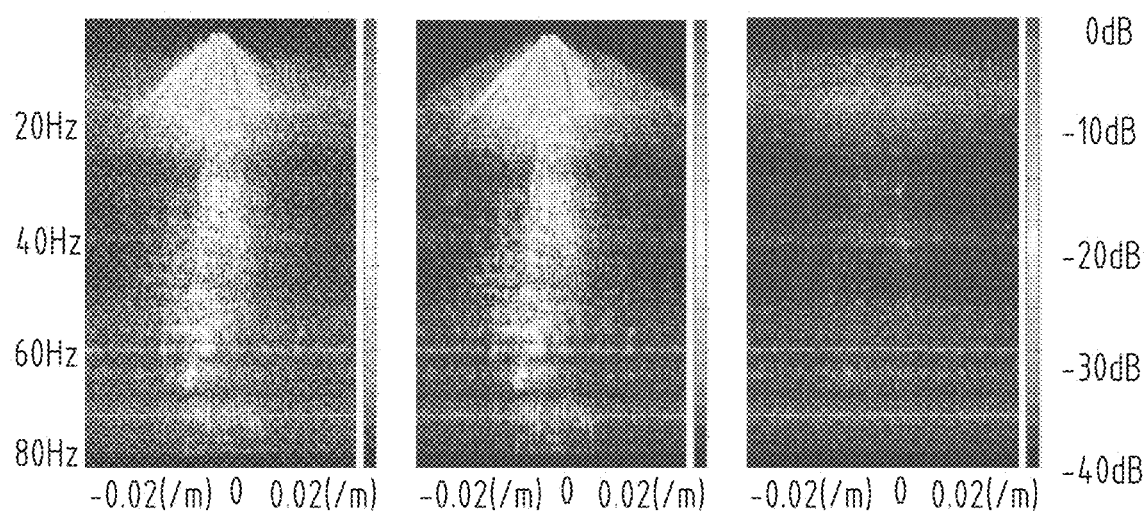

The proposed deblending method is applied to the common receiver gather of FIG. 3. No pre-processing procedure has been applied to the simulated data before deblending. FIG. 4 shows the deblending result of the common receiver gather of FIG. 3. FIG. 4a shows the original unblended data in the t-x domain (the true solution). FIG. 4b shows the deblended data in the t-x domain. FIG. 4c shows the separation error calculated by subtracting the separated data (FIG. 4b) from the original unblended data (FIG. 4a). It is noted that the x-axis now spans the full 8 km shot line. The result clearly shows that not only the refraction/reflection signals, but also the strong ground roll are separated well by the proposed method. FIGS. 4d, 4e and 4f respectively show the original unblended gather, the deblended gather and the separation error in the f-k domain. From FIG. 4f, the colour scaling indicates that the separation error is smaller than −20 dB for all frequencies.

Figures 5A, 5B, 5C:
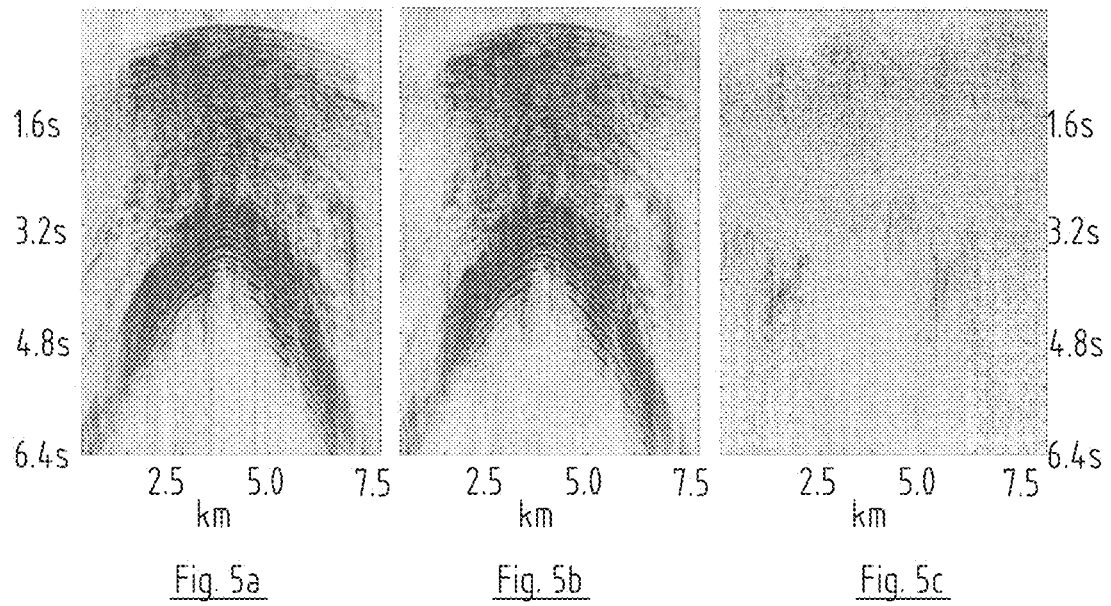
FIG. 5 (panels a to f) similar to FIG. 4 but using a common receiver gather from a receiver that is closer to the shot line.
Figures 5D, 5E, 5F:
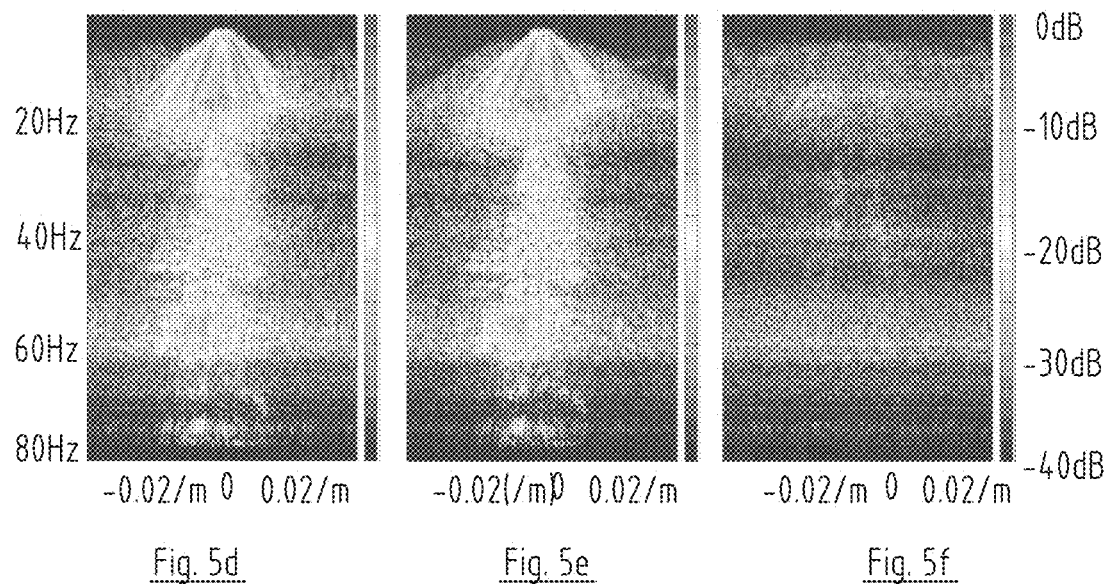

FIG. 5 shows the deblending result of another common receiver gather, where the receiver is closer to the shot line. Although the separation error is slightly higher, the result still shows that not only the refraction/reflection signals but also the strong ground roll are separated well by the proposed method. The colour scaling in FIG. 5f indicates that the separation error is still smaller than −20 dB for all frequencies.

Example B: Separating Simultaneous Sources without Dithering

The separation method described herein can be used to separate simultaneous sources acquired without dithering. In the present example, the seismic events associated with the simultaneous sources are assumed to have the same characteristics. Mathematically speaking, this means that the sources are represented by using the same set of basis functions, as expressed with for example the Radon operator.

For the sake of keeping the explanation simple, the method is illustrated for two simultaneous sources, again denoted as $S_1$ and $S_2$. They are fired synchronously (i.e. with zero delay and zero dithering time). The deblended signals from $S_1$ and $S_2$ are respectively located relative to the common receiver using the scalar quantities $x_i^{(1)}$ and $x_i^{(2)}$. The blended data can then be written as $$s_i^{(1)}(t) + s_i^{(2)}(t) = d_i(t) + n_i(t), \ i=1,2,\ldots,N \quad (19)$$

where $d_i(t)$ is the blended data, and $n_i(t)$ is the random noise. Equation (19) can be expressed matrix form as $$s^{(1)}(t) + s^{(2)}(t) = d(t) + n(t). \quad (20)$$

This is a special case of Equation (2). In accordance with the assumption discussed above, only one set of Radon operators is used to decompose both sources.

Similar to the deblending algorithm described in Example A, the deblending process is carried out in a subband-by-subband basis. Suppose the blended data $d_i(t)$ in Equation (19) has been decomposed into multiple subbands, and sources $s_i^{(1)}(t)$ and $s_i^{(2)}(t)$ in Equation (19) can be decomposed into subband Radon domain by using the non-equispaced subband Radon transform, expressed as $$s_i^{(1)}(t, x_i^{(1)}) = \sum_{k=1}^{Np} \sum_{l=1}^{N\tau} m(p_k, \tau_l = u(t, p_k, x_i^{(1)})) \quad (21)$$

and $$s_i^{(2)}(t, x_i^{(2)}) = \sum_{k=1}^{Np} \sum_{l=1}^{N\tau} m(p_k, \tau_l = u(t, p_k, x_i^{(2)})) \quad (22)$$

where $m(p_k, \tau_l)$ represent the Radon coefficients, $p_k$ is the slowness, $\tau_l$ is the intercept time, Np the number of slowness indices k used to define slowness vector p, and Nτ is the number of intercept time indices l used in the intercept time vector τ. Substituting Equations (21) and (22) into Equation (19) provides $$\sum_{k=1}^{Np}\sum_{l=1}^{N\tau} m(p_k, \tau_l = u(t, p_k, x_i^{(1)})) + \qquad (23)$$
$$\sum_{k=1}^{Np}\sum_{l=1}^{N\tau} m(p_k, \tau_l = u(t, p_k, x_i^{(2)})) = d_i(t) + n_i(t)$$

Equation (23) is suitable transformed into frequency domain, and expressed in matrix form as $$(R^{(1)}(f)R^{(2)}(f))m=d(f)+n(f) \qquad (24)$$

where $R^{(1)}(f)$ and $R^{(2)}(f)$ are Radon operators associated with source $S_1$ and $S_2$, respectively. The deblending problem of the two sources $S_1$ and $S_2$ in each subband can then be expressed as minimising the following nonlinear objective function $$J = \sum_{i=1}^{Nf} \|d(f_i) - (R^{(1)}(f_i) + R^{(2)}(f_i))m\|_2^2 \qquad (25)$$

where $N_f$, is the number of the frequencies in the subband.

Equations (24) and (25) may be expanded to model any number coherent sources. Equation (24) may be seen as a generalized counterpart of Equation (6) that was presented in Example A. The Radon operator generally consists of a sum of one or a plurality of source-specific Radon operators, whereby exclusively one of these one or said plurality of source-specific Radon operators is associated with exclusively one of the one or more coherent sources and vice versa. Each selected source-specific Radon operator, when multiplied with the model vector, describes the one coherent source with which the selected source-specific Radon operator is associated.

A similar deblending algorithm as described under Example A is used, as is summarized as follows:
1) Input a fullband gather;
2) Decompose the input fullband data into multiple subbands;
3) Select one subband;
4) Compute the Radon coefficients using the non-equispaced Radon transform described in Example A for each sources and compute the sum of them;
5) Select a percentage of models with most significant coefficients;
6) Compute the orthogonal projections of the models selected in Step 5);
7) Subtract the orthogonal projections computed in Step 6) from the subband of data selected in Step 3);
8) Repeat from Step 4) to Step 7) until a first stop criterion is met;
9) Compute the data of the separated sources at the regular positions;
10) Repeat from Step 3) to Step 9) until all subbands are processed;
11) Reconstruct the data back to the fullband for the separated two sources.

In this Example it was assumed that seismic events associated with the simultaneous sources have the same characteristics. Mathematically the sources can always be deblended, but the more similar the geological structures which are sampled by the simultaneous sources are, the more reliably the separation method can be applied for separation of the sources without dithering. This may mean that the deblending result becomes less reliable as the distance between the undithered simultaneous sources increases. How this translates to concrete values of inter-source distances depends on local circumstances, including the geological complexity of the earth formation. However, as a rule of thumb, it is conceived that deblending results of sources which has its shot positions within a pre-determined maximum vicinity distance of 50 m, preferably 30 m, more preferably 15 m, from the shot positions in the other source, can generally be assumed to yield acceptable deblending results for most practical purposes. Thus, the physical sources in each pair are preferably located within the pre-determined maximum vicinity distance from each other, such that seismic responses from physical sources can be decomposed by using one set of Radon coefficients while still acceptably accurately reflecting the sampled geological features in the earth.

Figure 7:
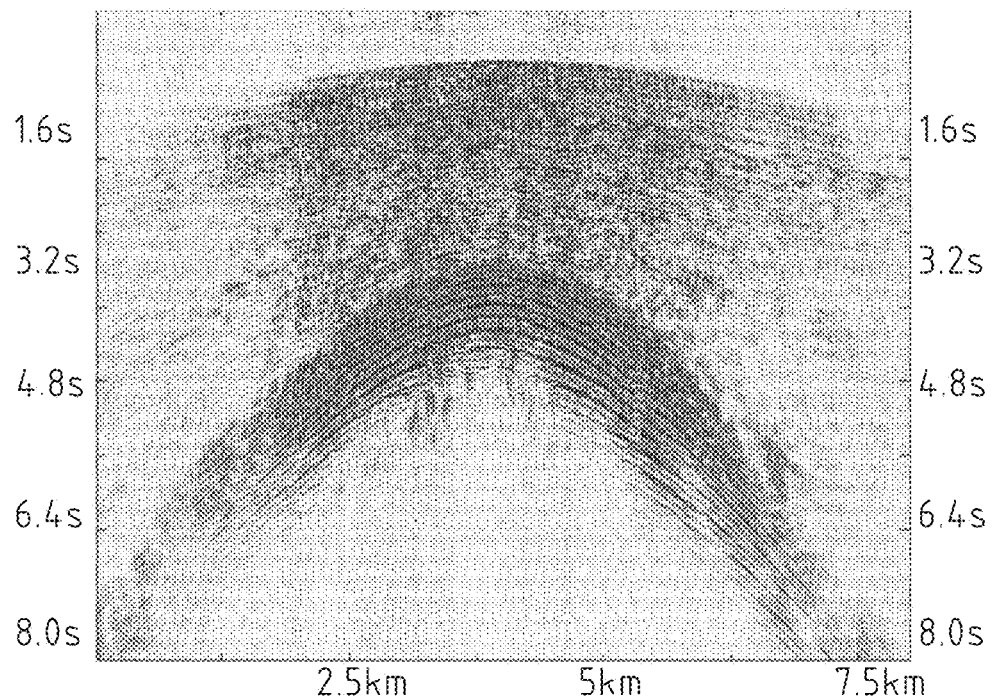
FIG. 7 shows a common receiver gather from the simulated simultaneous sources with zero dithering from the shooting geometry shown in FIG. 6.

To demonstrate the deblending for simultaneous sources without dither, the same cross-spread land field data as shown in FIGS. 3a and 4a is used to simulate a simultaneously acquired data without dithering. FIG. 6 shows the geometry of the simulated simultaneous source acquisition without dithering. The cluster of sources in the present gather consists of two groups of physical sources on a shot line, which are coherently overlapping. Each of these groups forms one of the sources, so there is one single source on the shot line consisting of "odd" numbered physical sources (shown as horizontally hatched physical sources 61 in FIG. 6) and one single source consisting of "even" numbered physical sources (shown as vertically hatched physical sources 62 in FIG. 6). The pairs of "odd" and "even" numbered physical sources are vibrating using slip sweep technique. The physical sources between successive groups also form pairs, similar to Example A, but in this case the simultaneously actuated two physical sources in each pair are 12.5 m apart from each other, and they are vibrating simultaneously without any dithering. FIG. 7 shows a common receiver gather sorted from the simulated blended data without dithering. The coherent events observed in FIG. 7 are seismic signals from the both vibrators, since both of them are vibrating regularly.

Figures 8A, 8B, 8C:
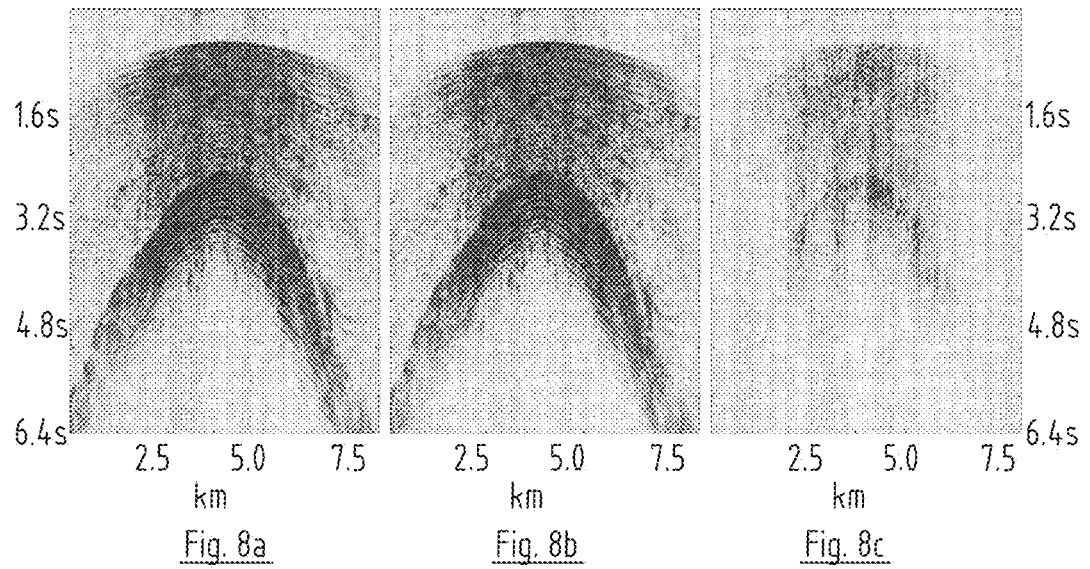
FIG. 8 (panels a to f) shows comparisons of the deblending result of the data from FIG. 7, against the unblended gather simulated with a single shooting scheme.
Figures 8D, 8E, 8F:
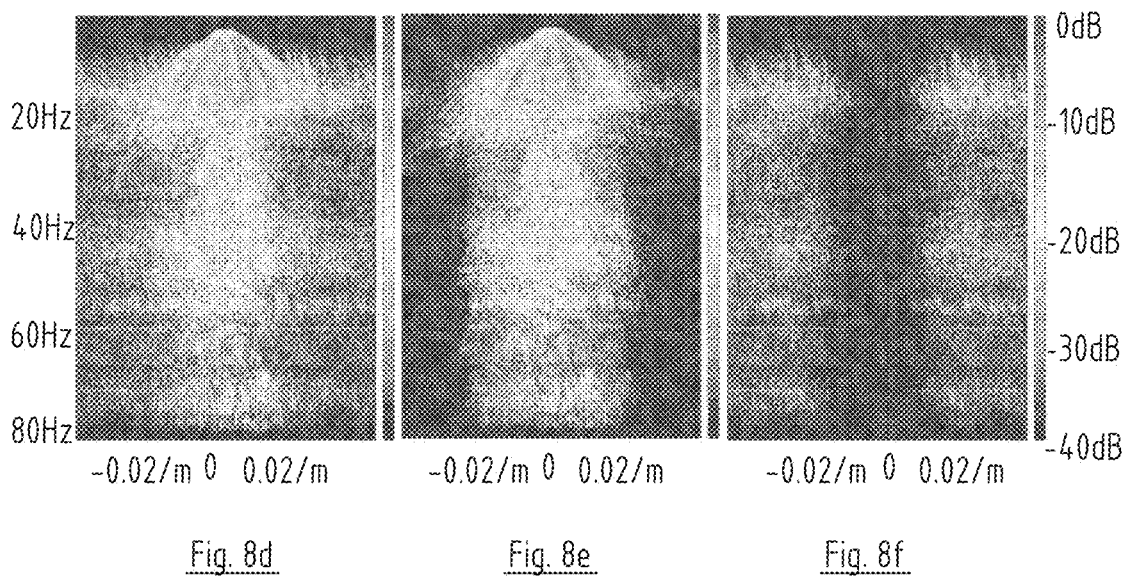

The proposed deblending method is applied to separate these two sources. No pre-processing procedure has been applied to the simulated data before deblending. FIG. 8 shows the deblending result. The panels (a) to (f) are organized in the same way as in FIG. 4. The result shows that not only the refraction/reflection signals but also the strong ground roll is separated well. The separation error (panels (c) and (f)) indicates the coherent signals are separated well with the separation error smaller than −30 dB for all frequencies.

Example C: Separating Sources with Multiple Blending Levels

In the practice of land simultaneous data acquisition, a cluster of vibrators is often employed and the slip-sweep technique with constant slip time is used. In order to avoid the interference between several clusters, the distance between the clusters is usually kept more than 12 km apart. The simulation results in Examples A and B demonstrate that the proposed deblending method can separate sources blended with dithering and without dithering. The present Example demonstrates that the method can also be used to separate gathers obtained using seismic acquisition with multiple blending levels.

The acquisition geometry is shown in FIG. 9. Within each cluster, such as Cluster 1 or Cluster 2, pairs of vibrators 12.5 m apart from each other are vibrating coherently without dithering. There are two groups of physical sources within each cluster, which are coherently overlapping. Each of these groups forms one source in the fullband gather, so there is one source in each cluster consisting of "odd" numbered physical sources and one source in each cluster consisting of "even" numbered physical sources. The pairs of "odd" and "even" numbered physical sources within each cluster are vibrating using slip sweep technique but the slip time varies. The distance between clusters is 6 km. This scenario should be able to greatly increase the productivity or to reduce the cost (up to 4 times) of seismic data acquisition.

One approach to deblend the above simultaneous sources with multiple levels is to cascade the two deblending algorithms described in Examples A and B. The deblending algorithm described in Example A is applied to separate the incoherent sources (formed by the groups of pairs of vibrators within one cluster) between the clusters, and then the deblending as described in Example B is applied to separate the coherent sources of one cluster where vibrator pairs are vibrating without dithering.

It is also possible to deblend the simultaneous sources with multiple levels (inter-cluster and inter-group) in a single deblending process. In this case, the non-linear objective function for the deblending process in one subband is written as $$J = \sum_{i=1}^{Nf} \left\| d(f_i) - B_k^{S_k^c}(f_i)\left(R_1^{S_1^g}(f_i) + R_2^{S_2^g}(f_i)\right) W_k^{S_k^c} m_k^{S_k^c} \right\|_2^2 \quad (26)$$

where $S_k^c$ represents the sources at the cluster level, $S_1^g$ and $S_2^g$ represent the two sources formed by the respective groups of physical sources within the cluster, and $N_f$ is the number of frequencies within the subband. The objective function for the orthogonal projection is written as $$J_{op} = \| d(f) - B^{S_k^c}(f)(R_{op}^{S_1^g}(f) + R_{op}^{S_2^g}(f)) m_{op}^{S_k^c}(f) \|_2^2 \quad (27)$$

where $B^{S_k^c}(f)$ is the blending matrix (variable slip time) associated with the source at the cluster level, and the $B^{S_k^c}(f)$ is an identity matrix since the random time of slip time has been removed, $R_{op}^{S_1^g}(f)$ and $R_{op}^{S_1^g}(f)$ are the Radon operators computed associated with the two sources within the cluster respectively, and $m_{op}^{S_k^c}(f)$ represents the orthogonal projections for these two sources.

The fullband of blended algorithm for the simultaneous sources with multiple levels is summarized as follows:
1) Cross-correlate the continuous recorded data with the pilot sweep signal;
2) Cut the data into shots where the zero time of each shot is the firing time of the shot;
3) Input a fullband gather;
4) Select the coherently interfering sources from one cluster;
5) Subtract the coherently interfering sources from the other clusters that are separated in the previous iteration except the coherently interfering sources selected in Step 4) from the data;
6) Remove the random part of the variable slip time associated the coherently interfering sources;
7) Decompose the input fullband data into multiple subbands;
8) Select one subband;
9) Compute the Radon coefficients of the coherently interfering sources using the non-equispaced Radon transform described under Example A;
10) Select a percentage of models with most significant coefficients;
11) Compute the orthogonal projections of the models selected in Step 10);
12) Subtract the orthogonal projections computed in Step 11) from the subband of data selected in Step 8);
13) Repeat from Step 9) to Step 12) until a first stop criterion is met;
14) Compute the data of the separated single source at the regular positions from the separated sources;
15) Repeat from Step 7) to Step 14) until all subbands are processed;
16) Reconstruct the data back to the fullband for the separated coherently interfering sources selected in Step 4);
17) Repeat from Step 4) to Stop 16) until all the coherently interfering sources associated with each cluster are separated;
18) Repeat from Step 4) to Step 17) until a second stop criterion is met.

Example D: Marine OSB Gathers

This Example demonstrates the deblending can also be applied to deblend marine data obtained using ocean bottom seismographs (OBS). Two shot lines of marine OBS field data are used to simulate a simultaneous source acquisition. The shot interval is 50 m and the two shot lines are 100 m apart. One source is firing regularly, and the random firing time for the second source with respect to the firing time of the first source is varying from 2850 ms to 3150 ms.

Figure 10:
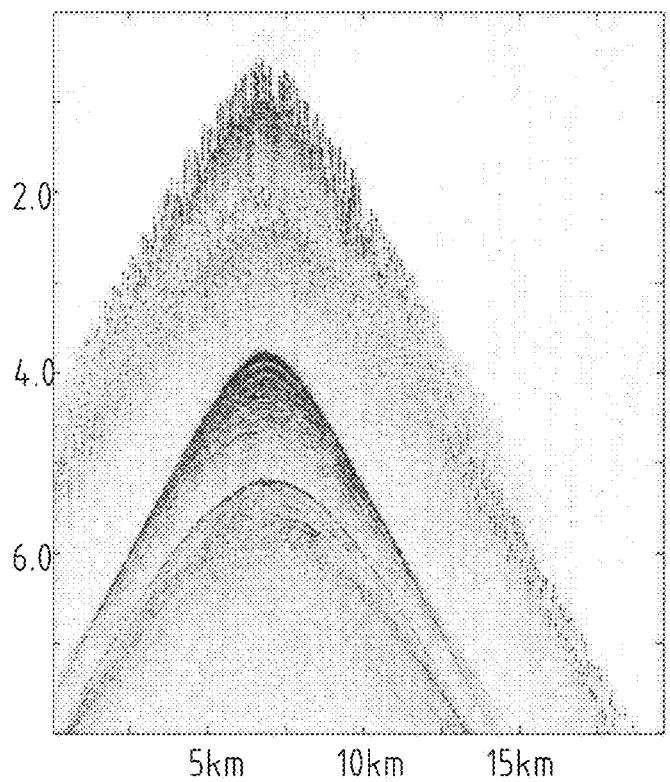
FIG. 10 shows a common receiver gather from simulated simultaneous data using marine OBS data.

FIG. 10 shows a common receiver gather of blended data simulated this way. The strong 'random' events are seismic signals from the second source fired with random delays.

Figures 11A, 11B, 11C:
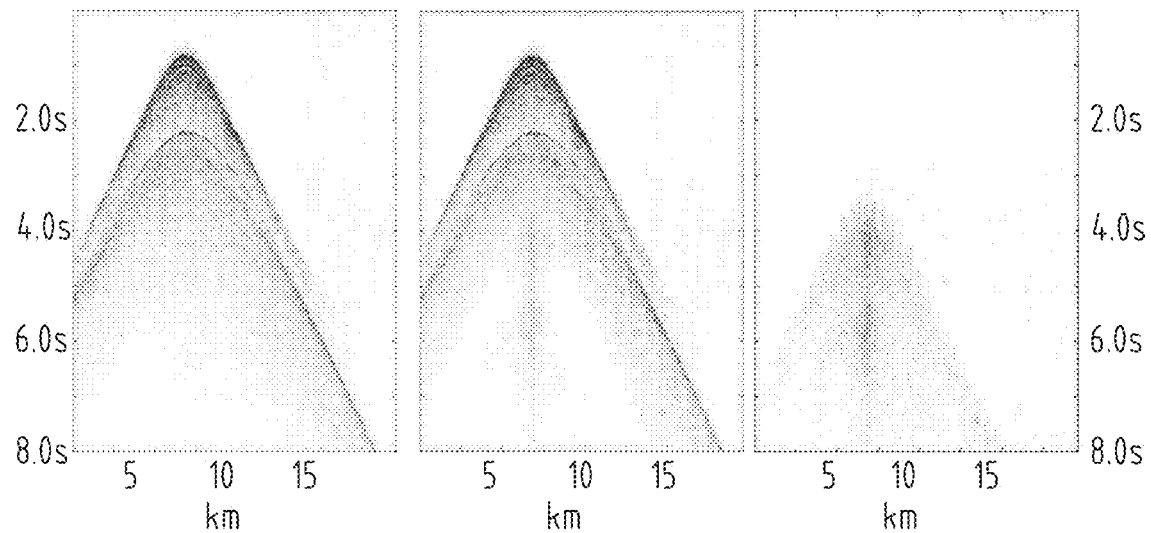
FIG. 11 (panels a to f) shows comparisons of the deblending result of the first source of the data from FIG. 10, against the unblended gather simulated with a single shooting scheme.
Figures 11D, 11E, 11F:
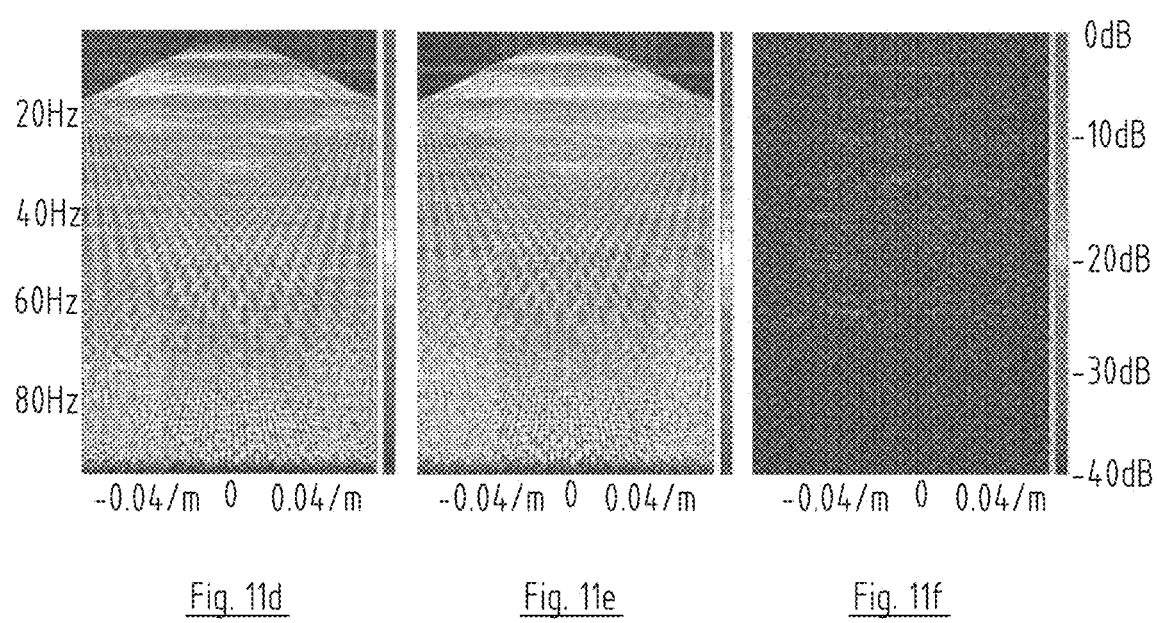
Figures 12A, 12B, 12C:
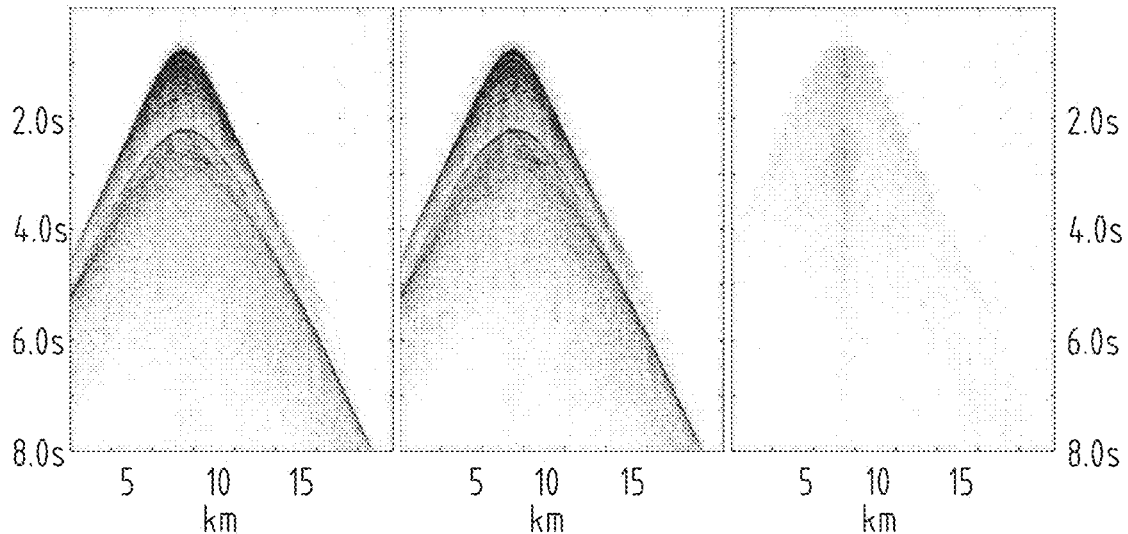
FIG. 12 (panels a to f) shows comparisons of the deblending result of the second source of the data from FIG. 10, against the unblended gather simulated with a single shooting scheme.
Figures 12D, 12E, 12F:
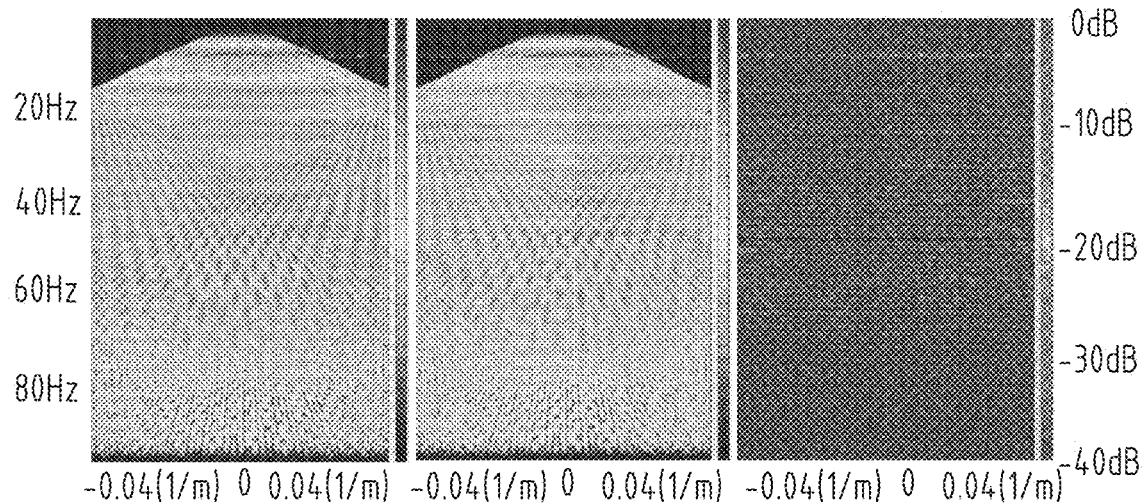

FIGS. 11 and 12 respectively show the deblending result of the first and second source. The panels (a) to (f) are arranged in the same way as in FIG. 3. The results show that all the coherent seismic signals were separated well by the proposed method. The plots in the f-k domain (panels (d) and (e)) clearly show that the seismic signals in both sources are aliased. The randomness and the low level of amplitude spectrum in the separation error plot (panel (f)) indicates that these aliased seismic signals are separated very well, and the separation error is smaller than −30 dB for all frequencies and wavenumbers. This Example thus demonstrates that aliased seismic signals can be separated with small separation errors.

This concludes the description of the detailed Examples.

The system and method described herein may be put into practice in seismic acquisitions on land, or off-shore, in seismic acquisitions in a marine environment. Suitably, the sources are vibrators. Typical vibrators may be configured to sweep the frequency from a lower frequency, for instance 5 Hz, to an upper frequency, which may for instance be 80 Hz. A seismic vibrator source for use on land consists generally of a baseplate configured in contact with the ground. The baseplate is usually supported on a truck. A seismic wave is induced in the subsurface earth formation by applying a vibratory force to the plate, and this is typically done by applying a control waveform known as a "pilot sweep" in the vibrator actuator system. The pilot sweep is generally a constant amplitude swept frequency signal, although the amplitude of the vibration may in practice be ramped up and down at the start and, respectively, finish of the sweep, for instance to manage inertia of the vibrator mass. Marine vibrators are also available, as evidenced by for instance an article from Western Geco: "Marine Vibrators and the Doppler Effect", by Dragoset, which appeared in Geophysics, November 1988, pp. 1388-1398, vol. 53, No. 11. More recently, Geckinetics has introduced its AquaVib™ marine vibrator. Other examples exist.

The person skilled in the art will understand that the present invention can be carried out in many various ways without departing from the scope of the appended claims.

That which is claimed is:

1. A method for separating blended seismic data containing overlapping data responses to interfering seismic waves generated by a plurality of sources, comprising:
   (a) providing a fullband gather for a receiver, which fullband gather is one of the group consisting of a common receiver gather, a common midpoint gather and a common offset gather, which fullband gather comprises a set of blended traces that contain seismic signals representing energy received from a plurality of clusters, each of which clusters comprising multiple sources overlapping in time-frequency domain, wherein each source represents seismic energy that is released in the earth by one group of vibrators defined such that none of the vibrators within said one group is overlapping in time-frequency domain with any other source within the same one group, and wherein each vibrator within a single cluster of said plurality of clusters is uniquely located at its own unique position vector with respect to the receiver and fired at a known firing time;
   (b) creating one or more single source gathers by iteratively separating signals of one or more selected single sources from the fullband gather, wherein performing steps b1 to b6:
   (b1) selecting one source from the multiple sources of one cluster of said plurality of clusters;
   (b2) creating an intermediate fullband gather by subtracting from the set of blended traces of the fullband gather signals of all sources from other clusters of said plurality of clusters, which have already been separated from the fullband gather in earlier iterations of performing steps b1 to b7, thereby obtaining the intermediate fullband gather consisting of intermediate blended traces;
   (b3) unless the intermediate fullband gather is already source-aligned to the selected source, source-aligning the intermediate fullband gather of step b2 by cutting the blended traces in the intermediate fullband gather such that each intermediate blended trace in the intermediate fullband gather is cut to start at a time zero coincident with the firing time of the vibrator belonging to the unique position vector of the blended trace associated with that source;
   (b4) creating multiple subband gathers from the intermediate fullband gather by decomposing the source-aligned fullband gather from b3 into frequency subbands;
   (b5) for each subband gather of the multiple subband gathers from b4 separating the signal corresponding to the one source selected in step b1 thereby creating one separated single source subband gather, by performing steps b5.1 to b5.3 until all subband gathers from the multiple subband gathers are processed;
   (b5.1) one after another selecting one subband gather from the multiple subband gathers, computing non-equispaced Radon coefficients, and computing orthogonal projections of selected Radon coefficients within the selected subband gather by iteratively performing steps b5.1.1 to b5.1.5 whereby minimizing an objective function until a pre-defined first stop-criterion is met;
   (b5.1.1) creating an intermediate subband gather by subtracting orthogonal projections that have already been obtained while performing steps b5.1.2 to b5.1.5 from the selected subband gather;
   (b5.1.2) computing estimated Radon coefficients of the intermediate subband gather from step b5.1 by transforming the intermediate subband gather into a Radon domain using a non-equispaced Radon transformation, thereby producing a collection of estimated Radon coefficients;
   (b5.1.3) selecting a number of the estimated Radon coefficients, wherein each of the selected estimated Radon coefficients have a higher amplitude than each of the non-retained estimated Radon coefficients within the collection of estimated Radon coefficients;
   (b5.1.4) computing orthogonal projections of exclusively the selected estimated Radon coefficients from step b5.1.3;
   (b5.1.5) going back to step b5.1.1 until the pre-defined first stop-criterion is met;
   (b5.2) creating the separated single source subband gathers by recalculating the orthogonal projections by interpolating to a regular grid of source positions;
   (b5.3) going back to step b5.1 until all subband gathers from the multiple subband gathers are processed;
   (b6) creating the one or more single source gathers in fullband by reconstructing the fullband gather from the separated single source subband gathers.

2. The method of claim 1, wherein the pre-defined first stop-criterion from step b5.1.5 is given by a pre-determined first number of iterations or wherein a first residual in the objective function, or a change in the first residual, is less than a pre-determined first maximum.

3. The method according to claim 1, further comprising the step:
   (b7) going back to step b1 until all sources of the multiple sources are processed.

4. The method of claim 3, wherein step b, including steps b1 to b7 is performed again until a pre-defined second stop-criterion is met.

5. The method of claim 4, wherein the pre-defined second stop-criterion is given by a pre-determined second number of iterations or wherein a second differential between a modelled fullband gather reconstructed from the separated single source gathers and the fullband gather originally provided in step a is less than a pre-determined second maximum.

6. The method of claim 1, wherein the orthogonal projections of said selected Radon coefficients step b5.1 together form a model vector for each subband which, when multiplied with a Radon operator, describes a modelled data vector of one or more coherent sources in each subband.

7. The method of claim 6, wherein the Radon operator consists of a sum of one or a plurality of source-specific Radon operators, whereby exclusively one of these one or said plurality of source-specific Radon operators is associated with exclusively one of the one or more coherent sources and vice versa, whereby each selected source-specific Radon operator, when multiplied with the model vector, describes the one coherent source with which the selected source-specific Radon operator is associated.

8. The method of claim 6, wherein the coherent sources comprise at least two simultaneous sources without dithering.

9. The method of claim 8, wherein, considering two distinct groups in one cluster, each vibrator of one of the two distinct groups exclusively forms a pair with exclusively one vibrator in the other one of the two distinct groups, whereby every vibrator in the one of the two distinct groups is paired up with one unique vibrator in the other one of the two distinct groups, whereby the vibrators in each pair are fired with a fixed delay time without dithering between the vibrators in the pair which fixed delay time is the same for all pairs.

10. The method of claim 9, wherein the fixed delay time is zero such that the resulting sources are synchronized sources.

11. The method of claim 9, wherein the vibrators in each pair are located within pre-determined maximum vicinity distance from each other, such that seismic responses from vibrators can be decomposed by using one set of Radon coefficients.

12. The method of claim 1, wherein the one or more single source gathers created in step b6 are combined into one deblended gather wherein each trace is a single source trace.

13. The method of claim 1, wherein steps b and b1 to b6 including all substeps of step b5 are performed with a computer processor.

14. The method of claim 1, further comprising a step of (c) outputting the one or more single source gathers to an output device.

15. A system for separating blended seismic data containing overlapping data responses to interfering seismic waves generated by a plurality of sources, comprising:
   a non-transitory computer readable storage medium on which is stored a fullband gather for a receiver, which fullband gather is one of the group consisting of a common receiver gather, a common midpoint gather and a common offset gather, which fullband gather comprises a set of blended traces that contain seismic signals representing energy received from a plurality of clusters, each of which clusters comprising multiple sources overlapping in time-frequency domain, wherein each source represents seismic energy that is released in the earth by one group of vibrators defined such that none of the vibrators within said one group is overlapping in time-frequency domain with any other source within the same one group, and wherein each vibrator within a single cluster of said plurality of clusters is uniquely located at its own unique position vector with respect to the receiver and fired at a known firing time;
   a computer processor operatively coupled to the computer readable storage medium and programmed to create one or more single source gathers by iteratively separating signals of one or more selected single sources from the fullband gather, wherein performing steps b1 to b6:
      (b1) selecting one source from the multiple sources of one cluster of said plurality of clusters;
      (b2) creating an intermediate fullband gather by subtracting from the set of blended traces of the fullband gather signals of all sources from other clusters of said plurality of clusters, which have already been separated from the fullband gather in earlier iterations of performing steps b1 to b7, thereby obtaining the intermediate fullband gather consisting of intermediate blended traces;
      (b3) unless the intermediate fullband gather is already source-aligned to the selected source, source-aligning the intermediate fullband gather of step b2 by cutting the blended traces in the intermediate fullband gather such that each intermediate blended trace in the intermediate fullband gather is cut to start at a time zero coincident with the firing time of the vibrator belonging to the unique position vector of the blended trace associated with that source;
      (b4) creating multiple subband gathers from the intermediate fullband gather by decomposing the source-aligned fullband gather from b3 into frequency subbands;
      (b5) for each subband gather of the multiple subband gathers from b4 separating the signal corresponding to the one source selected in step b1 thereby creating one separated single source subband gather, by performing steps b5.1 to b5.3 until all subband gathers from the multiple subband gathers are processed;
      (b5.1) one after another selecting one subband gather from the multiple subband gathers, computing non-equispaced Radon coefficients, and computing orthogonal projections of selected Radon coefficients within the selected subband gather by iteratively performing steps b5.1.1 to b5.1.5 whereby minimizing an objective function until a pre-defined first stop-criterion is met;
      (b5.1.1) creating an intermediate subband gather by subtracting orthogonal projections that have already been obtained while performing steps b5.1.2 to b5.1.5 from the selected subband gather;
      (b5.1.2) computing estimated Radon coefficients of the intermediate subband gather from step b5.1 by transforming the intermediate subband gather into a Radon domain using a non-equispaced Radon transformation, thereby producing a collection of estimated Radon coefficients;
      (b5.1.3) selecting a number of the estimated Radon coefficients, wherein each of the selected estimated Radon coefficients have a higher amplitude than each of the non-retained estimated Radon coefficients within the collection of estimated Radon coefficients;
      (b5.1.4) computing orthogonal projections of exclusively the selected estimated Radon coefficients from step b5.1.3;
      (b5.1.5) going back to step b5.1.1 until the pre-defined first stop-criterion is met;
      (b5.2) creating the separated single source subband gathers by recalculating the orthogonal projections by interpolating to a regular grid of source positions;
      (b5.3) going back to step b5.1 until all subband gathers from the multiple subband gathers are processed;
      (b6) creating the one or more single source gathers in fullband by reconstructing the fullband gather from the separated single source subband gathers; and
   an output device operatively coupled to the computer processor and configured to output the one or more single source gathers created in step b6.

16. A method for separating blended seismic data containing overlapping data responses to interfering seismic waves generated by a plurality of sources, comprising:
   (a) providing a fullband gather for a receiver, which fullband gather is one of the group consisting of a common receiver gather, a common midpoint gather and a common offset gather, which fullband gather comprises a set of blended traces that contain seismic signals representing energy received from a cluster comprising multiple sources overlapping in time-frequency domain, wherein each source represents seismic energy that is released in the earth by one group of vibrators defined such that none of the vibrators within said one group is overlapping in time-frequency domain with any other source within the same one group, and wherein each vibrator within a single cluster of said plurality of clusters is uniquely located at its own unique position vector with respect to the receiver and fired at a known firing time;

(b) creating one or more single source gathers by iteratively separating signals of one or more selected single sources from the fullband gather, wherein performing steps b1 to b6:

(b1) selecting one source from the multiple sources of the cluster;

(b2) proceeding to step b3;

(b3) unless the fullband gather is already source-aligned to the selected source, source-aligning the fullband gather by cutting the blended traces in the fullband gather such that each blended trace in the fullband gather is cut to start at a time zero coincident with the firing time of the vibrator belonging to the unique position vector of the blended trace associated with that source;

(b4) creating multiple subband gathers from the fullband gather by decomposing the source-aligned fullband gather from b3 into frequency subbands;

(b5) for each subband gather of the multiple subband gathers from b4 separating the signal corresponding to the one source selected in step b1 thereby creating one separated single source subband gather, by performing steps b5.1 to b5.3 until all subband gathers from the multiple subband gathers are processed;

(b5.1) one after another selecting one subband gather from the multiple subband gathers, computing non-equispaced Radon coefficients, and computing orthogonal projections of selected Radon coefficients within the selected subband gather by iteratively performing steps b5.1.1 to b5.1.5 whereby minimizing an objective function until a pre-defined first stop-criterion is met;

(b5.1.1) creating an intermediate subband gather by subtracting orthogonal projections that have already been obtained while performing steps b5.1.2 to b5.1.5 from the selected subband gather;

(b5.1.2) computing estimated Radon coefficients of the intermediate subband gather from step b5.1 by transforming the intermediate subband gather into a Radon domain using a non-equispaced Radon transformation, thereby producing a collection of estimated Radon coefficients;

(b5.1.3) selecting a number of the estimated Radon coefficients, wherein each of the selected estimated Radon coefficients have a higher amplitude than each of the non-retained estimated Radon coefficients within the collection of estimated Radon coefficients;

(b5.1.4) computing orthogonal projections of exclusively the selected estimated Radon coefficients from step b5.1.3;

(b5.1.5) going back to step b5.1.1 until the pre-defined first stop-criterion is met;

(b5.2) creating the separated single source subband gathers by recalculating the orthogonal projections by interpolating to a regular grid of source positions;

(b5.3) going back to step b5.1 until all subband gathers from the multiple subband gathers are processed;

(b6) creating the one or more single source gathers in fullband by reconstructing the fullband gather from the separated single source subband gathers.

17. The method of claim 16, wherein the pre-defined first stop-criterion from step b5.1.5 is given by a pre-determined first number of iterations or wherein a first residual in the objective function, or a change in the first residual, is less than a pre-determined first maximum.

18. The method according to claim 16, further comprising the step:

(b7) going back to step b1 until all sources of the multiple sources are processed.

19. The method of claim 18, wherein step b, including steps b1 to b7 is performed again until a pre-defined second stop-criterion is met.

20. The method of claim 19, wherein the pre-defined second stop-criterion is given by a pre-determined second number of iterations or wherein a second differential between a modelled fullband gather reconstructed from the separated single source gathers and the fullband gather originally provided in step a is less than a pre-determined second maximum.

21. The method of claim 16, wherein the orthogonal projections of said selected Radon coefficients step b5.1 together form a model vector for each subband which, when multiplied with a Radon operator, describes a modelled data vector of one or more coherent sources in each subband.

22. The method of claim 21, wherein the Radon operator consists of a sum of one or a plurality of source-specific Radon operators, whereby exclusively one of these one or said plurality of source-specific Radon operators is associated with exclusively one of the one or more coherent sources and vice versa, whereby each selected source-specific Radon operator, when multiplied with the model vector, describes the one coherent source with which the selected source-specific Radon operator is associated.

23. The method of claim 21, wherein the coherent sources comprise at least two simultaneous sources without dithering.

24. The method of claim 23, considering two distinct groups in one cluster, each vibrator of one of the two distinct groups exclusively forms a pair with exclusively one vibrator in the other one of the two distinct groups, whereby every vibrator in the one of the two distinct groups is paired up with one unique vibrator in the other one of the two distinct groups, whereby the vibrators in each pair are fired with a fixed delay time without dithering between the vibrators in the pair which fixed delay time is the same for all pairs.

25. The method of claim 24, wherein the fixed delay time is zero such that the resulting sources are synchronized sources.

26. The method of claim 24, wherein the vibrators in each pair are located within pre-determined maximum vicinity distance from each other, such that seismic responses from vibrators can be decomposed by using one set of Radon coefficients.

27. The method of claim 16, wherein the one or more single source gathers created in step b6 are combined into one deblended gather wherein each trace is a single source trace.

28. The method of claim 16, wherein steps b and b1 to b6 including all substeps of step b5 are performed with a computer processor.

29. The method of claim 16, further comprising a step of (c) outputting the one or more single source gathers to an output device.

30. A system for separating blended seismic data containing overlapping data responses to interfering seismic waves generated by a plurality of sources, comprising:

a non-transitory computer readable storage medium on which is stored a fullband gather for a receiver, which fullband gather is one of the group consisting of a common receiver gather, a common midpoint gather and a common offset gather, which fullband gather comprises a set of blended traces that contain seismic signals representing energy received from a plurality of clusters, each of which clusters comprising multiple sources overlapping in time-frequency domain, wherein each source represents seismic energy that is released in the earth by one group of vibrators defined such that none of the vibrators within said one group is overlapping in time-frequency domain with any other source within the same one group, and wherein each vibrator within a single cluster of said plurality of clusters is uniquely located at its own unique position vector with respect to the receiver and fired at a known firing time;

a computer processor operatively coupled to the computer readable storage medium and programmed to create one or more single source gathers by iteratively separating signals of one or more selected single sources from the fullband gather, wherein performing steps b1 to b6:

(b1) selecting one source from the multiple sources of one cluster of said plurality of clusters;

(b2) proceeding to b3;

(b3) unless the fullband gather is already source-aligned to the selected source, source-aligning the fullband gather of step b2 by cutting the blended traces in the fullband gather such that each intermediate blended trace in the fullband gather is cut to start at a time zero coincident with the firing time of the vibrator belonging to the unique position vector of the blended trace associated with that source;

(b4) creating multiple subband gathers from the fullband gather by decomposing the source-aligned fullband gather from b3 into frequency subbands;

(b5) for each subband gather of the multiple subband gathers from b4 separating the signal corresponding to the one source selected in step b1 thereby creating one separated single source subband gather, by performing steps b5.1 to b5.3 until all subband gathers from the multiple subband gathers are processed;

(b5.1) one after another selecting one subband gather from the multiple subband gathers, computing non-equispaced Radon coefficients, and computing orthogonal projections of selected Radon coefficients within the selected subband gather by iteratively performing steps b5.1.1 to b5.1.5 whereby minimizing an objective function until a pre-defined first stop-criterion is met;

(b5.1.1) creating an intermediate subband gather by subtracting orthogonal projections that have already been obtained while performing steps b5.1.2 to b5.1.5 from the selected subband gather;

(b5.1.2) computing estimated Radon coefficients of the intermediate subband gather from step b5.1 by transforming the intermediate subband gather into a Radon domain using a non-equispaced Radon transformation, thereby producing a collection of estimated Radon coefficients;

(b5.1.3) selecting a number of the estimated Radon coefficients, wherein each of the selected estimated Radon coefficients have a higher amplitude than each of the non-retained estimated Radon coefficients within the collection of estimated Radon coefficients;

(b5.1.4) computing orthogonal projections of exclusively the selected estimated Radon coefficients from step b5.1.3;

(b5.1.5) going back to step b5.1.1 until the pre-defined first stop-criterion is met;

(b5.2) creating the separated single source subband gathers by recalculating the orthogonal projections by interpolating to a regular grid of source positions;

(b5.3) going back to step b5.1 until all subband gathers from the multiple subband gathers are processed;

(b6) creating the one or more single source gathers in fullband by reconstructing the fullband gather from the separated single source subband gathers; and an output device operatively coupled to the computer processor and configured to output the one or more single source gathers created in step b6.

* * * * *

UNITED STATES PATENT AND TRADEMARK OFFICE
CERTIFICATE OF CORRECTION

PATENT NO. : 11,143,774 B2
APPLICATION NO. : 16/064295
DATED : October 12, 2021
INVENTOR(S) : Ji et al.

It is certified that error appears in the above-identified patent and that said Letters Patent is hereby corrected as shown below:

In the Specification

In Column 13, Line 24, delete "$m^{Sk}$" and insert -- $m^{Sk}$ (f) --, therefor.

In Column 19, Line 8, delete "Geckinetics" and insert -- Geokinetics --, therefor.

Signed and Sealed this
Twenty-first Day of June, 2022

Katherine Kelly Vidal
*Director of the United States Patent and Trademark Office*